United States Patent Office 3,823,139
Patented July 9, 1974

---

3,823,139
CEPHALOSPORINS HAVING A γ-CARBONYL GROUP AT POSITION-3
William George Elphinstone Underwood, Stoke Poges, England, assignor to Glaxo Laboratories Limited, Greenford, England
No Drawing. Filed Mar. 23, 1971, Ser. No. 127,403
Claims priority, application Great Britain, Mar. 26, 1970, 14,981/70; Apr. 23, 1970, 19,631/70
Int. Cl. C07d 99/24
U.S. Cl. 260—243 C        14 Claims

ABSTRACT OF THE DISCLOSURE

The invention is concerned with $\Delta^3$-4-carboxy cephalosporin antibiotics possessing a γ-carbonyl group, viz the skeletal group $$-CH_2-\overset{|}{\underset{|}{C}}-\overset{O}{\overset{\|}{C}}-$$

at the 3-position. The invention also describes processes for the preparation of such compounds.

---

This invention is concerned with improvements in or relating to antibiotics. In particular, the invention is concerned with a novel group of $\Delta^3$-4-carboxycephalosporin antibiotics.

The cephalosporin compounds referred to in this specification are generally named with reference to cepham (see *J. Amer. Chem. Soc.* 1962, 84, 3400). The term "cephem" refers to the basic cepham structure with a single double bond. Where a dotted line bridges the 2-, 3- and 4-positions this indicates that the compound may be a ceph-2-em or ceph-3-em compound.

As is well known in the art, $\Delta^3$-4-carboxycephalosporin antibiotics are compounds which are generally depicted by the formula

[Structure: $R^1NH$—cepham ring system—$R^2$ at 3-position, COOH at 4-position]

wherein $R^1$ is a carboxylic acyl group and $R^2$ is the 3-substituent.

The novel compounds of the invention are characterized by possessing a substituent at the 3-position in which a carbonyl group is linked to the cephalosporin nucleus through two carbon atoms. The compounds thus possess the skeletal group $$-CH_2-\overset{|}{\underset{|}{C}}-\overset{O}{\overset{\|}{C}}-$$

at the 3-position. These compounds possess activity against a range of gram-positive and gram-negative organisms.

According to one embodiment of the invention I provide compounds of the general formula

[Structure: $R^1NH$—cepham ring system—$CH_2.\overset{R^3}{\underset{|}{C}}.CO.R^4$ at 3-position ($R^2$), COOH at 4-position]   I (wherein $R^1$ is a carboxylic acyl group; $R^2$ is selected from hydrogen, lower alkyl, phenyl, substituted phenyl, lower alkoxy carbonyl, mono- or di-arylloweralkoxy carbonyl, lower alkyl carbonyl, aryl lower alkyl or $C_5$ or $C_6$ cycloalkyl; $R^3$ is selected from lower alkyl, phenyl, substituted phenyl; $R^3$ is selected from lower alkyl, phenyl, substituted phenyl, lower alkoxy carbonyl, mono- or di-aryllower- alkoxy carbonyl, lower alkyl carbonyl, aryl lower alkyl or $C_5$ or $C_6$ cycloalkyl and $R^4$ is selected from hydrogen, lower alkyl, phenyl, substituted phenyl, aryl lower alkyl or $C_5$ or $C_6$ cycloalkyl) and physiologically acceptable derivatives thereof e.g. base salts (where applicable) and acid addition salts (where applicable) and compounds obtained by reacting an amino group and/or acylamido group(s) of the 7-side chain with a ketone, e.g. acetone or methyl ethyl ketone, or an aldehyde.

By the term "physiologically acceptable" as applied to compounds of the invention I mean those derivatives which are physiologically acceptatble in the dosage at which they are administered. Such derivatives include salts and esters.

Since optically-active centres may be present in the substituents at the 3- and/or the 7-positions the invention includes within its scope the various diastereoisomers as well as mixtures thereof.

Compounds according to the invention possess antibacterial activity against a range of gram positive and gram negative organisms and are of value in human and veterinary medicine. They may also be of value in the preparation of other 3-substituted cephalosporin compounds.

The expressions "lower alkyl" and "lower alkoxy" as used herein indicate that the groups in question contain 1–8 carbon atoms.

Where any of $R^2$, $R^3$ or $R^4$ are lower alkyl groups they are preferably methyl or ethyl.

Where any of $R^2$, $R^3$ or $R^4$ is a substituted phenyl group the substituent on the phenyl group may be one or more of halogen (e.g. chlorine or bromine), lower alkyl, lower alkoxy, nitro, amino or lower alkylamino.

The group $R^1$ in the above formula may represent a wide variety of acyl groups which may contain 1–20 carbon atoms. Specific acyl groups are illustrated in the accompanying list which is not intended to be exhaustive:

(i) $R^uC_nH_{2n}CO$— where $R^u$ is aryl (carbocyclic or heterocyclic), cycloalkyl, substituted aryl, substituted cycloalkyl, cyclohexadienyl, or a non-aromatic heterocyclic or mesoionic group, and $n$ is an integer from 1–4. Examples of this group include phenylacetyl; substituted phenylacetyl e.g. fluorophenylacetyl, nitrophenylacetyl, aminophenylacetyl, acetoxyphenylacetyl, methoxyphenylacetyl, methylphenylacetyl, or hydroxyphenylacetyl; N,N-bis (2-chloroethyl) aminophenylpropionyl; thien-2- and 3-ylacetyl; 4-isoxazolyl and substituted 4-isoxazolylacetyl; pyridylacetyl; tetrazolylacetyl or a sydnoneacetyl group. The substituted 4-isoxazolyl group may be a 3-aryl-5-methyl isoxazol-4-yl group, the aryl group being e.g. phenyl or halophenyl e.g. chloro- or bromo- phenyl. An acyl group of this type is 3-o-chlorophenyl-5-methyl-isoxazol-4-yl-acetyl.

(ii) $C_nH_{2n+1}CO$— where $n$ is an integer from 1–7. The alkyl group may be straight or branched and, if desired, may be interrupted by an oxygen or sulphur atom or substituted by e.g. a cyano group, a carboxy group, an alkoxycarbonyl group, a hydroxy group or a carboxycarbonyl group (—CO.COOH). Examples of such groups include cyanoacetyl, hexanoyl, heptanoyl, octanoyl and butylthioacetyl.

(iii) $C_nH_{2n-1}CO$— where $n$ is an integer from 2–7. The alkenyl group may be straight or branched and, if desired, may be interrupted by an oxygen or a sulphur atom. An example of such a group is allylthioacetyl.

(iv)

$$R^uO\overset{R^v}{\underset{R^w}{\overset{|}{\underset{|}{C}}}}-CO-$$

where $R^u$ has the meaning defined under (i) and in addition may be benzyl, and $R^v$ and $R^w$ which may be the same or different each represent hydrogen, phenyl, benzyl, phenethyl or lower alkyl. Examples of such groups include phenoxyacetyl, 2-phenoxy-2-phenylacetyl, benzyloxyacetyl, 2-phenoxypropionyl, 2-phenoxybutyryl, methylthiophenoxyacetyl.

(v)

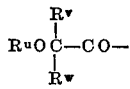

where $R^u$ has the meaning defined under (i) and, in addition, may be benzyl and $R^v$ and $R^w$ have the meanings defined under (iv). Examples of such groups include S-phenylthioacetyl, S - chlorophenylthioacetyl, S-fluorophenylthioacetyl, pyridylthioacetyl, and S-benzylthioacetyl.

(vi) $R^u Z(CH_2)_m CO$— where $R^u$ has the meaning defined under (i) and, in addition, may be benzyl, Z is an oxygen or sulphur atom and $m$ is an integer from 2–5. An example of such a group is S-benzylthiopropionyl.

(vii) $R^u CO$— where $R^u$ has the meaning defined under (i). Examples of such groups include benzoyl, substituted benzoyl (e.g. aminobenzoyl), 4-isoxazolyl- and substituted 4-isoxazolylcarbonyl, cyclopentanecarbonyl, sydnonecarbonyl, naphthoyl and substituted naphthoyl (e.g. 2-ethoxynaphthoyl), quinoxalinylcarbonyl and substituted quinoxalinylcarbonyl (e.g. 3-carboxy-2-quinoxalinylcarbonyl). Other possible substituents for benzoyl include alkyl, alkoxy, phenyl, phenyl substituted by carboxy, alkylamido, cycloalkylamido, allylamido, phenyl(lower) alkylamido, morpholinocarbonyl, pyrrolidinocarbonyl, piperidinocarbonyl, tetrahydropyridino, furfurylamido or N-alkyl-N-anilino, or derivatives thereof, and such substituents may be in the 2- or 2- and 6-positions. Examples of such substituted benzoyl groups are 2,6-dimethoxybenzoyl, 2-methylamidobenzoyl and 2-carboxybenzoyl. Where the group $R^u$ represents a substituted 4-isoxazolyl group, the substituents may be as set out above under (i). Examples of such 4-isoxazolyl groups are 3-phenyl-5-methyl-isoxazol - 4 - yl carbonyl, 3-o-chlorophenyl-5-methyl-isoxazol-4-yl carbonyl and 3-(2,6-dichlorophenyl)-5-methyl-isoxazol-4-yl carbonyl.

(viii)

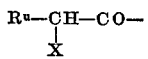

where $R^u$ has the meaning defined under (i) and X is amino, substituted amino (e.g. acylamido or a group obtained by reacting the α-aminoacylamido group of the 7-side chain with an aldehyde or ketone e.g. acetone, methylethylketone or ethyl acetoacetate), hydroxy, carboxy, esterified carboxy, azido, triazolyl, tetrazolyl, cyano, halogeno, acyloxy (e.g. formyloxy or lower alkanoyloxy) or etherified hydroxy group. Examples of such acyl groups are α-aminophenylacetyl, and α-carboxyphenylacetyl.

(ix)

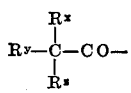

where $R^x$, $R^y$ and $R^z$ which may be the same or different may each represent lower alkyl, phenyl or substituted phenyl or $R^x$ represents hydrogen. An example of such an acyl group is triphenylmethylcarbonyl.

(x) $R^u$—NH—CO— where $R^u$ has the meaning defined under (i) and in addition may be hydrogen, lower alkyl or halogen substituted lower alkyl. An example of such a group is $Cl(CH_2)_2 NHCO$.

(xi)

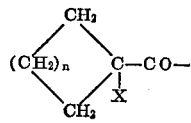

where X has the meaning defined under (viii) above and $n$ is an integer of from 1 to 4. An example of such an acyl group is 1-aminocyclohexanecarbonyl.

(xii) Amino acyl, for example $$R^w CH(NH_2).(CH_2)_n CO—$$

where $n$ is an integer from 1–10, or $$NH_2.C_n H_{2n} Ar(CH_2)_m CO$$

where $m$ is zero or an integer from 1–10, and $n$ is 0, 1 or 2, $R^w$ is a hydrogen atom or an alkyl, aralkyl or carboxy group or a group as defined under $R^u$ above, and Ar is an arylene group, e.g. p-phenylene or 1,4-naphthylene. Examples of such groups are disclosed in British Patent Specification No. 1,054,806. A group of this type is the p-aminophenylacetyl group. Other acyl groups of this type include those, e.g. 5-aminodipoyl, derived from naturally occurring amino acids, and derivatives thereof e.g. N-benzoyl-5-aminoadipoyl.

(xiii) Substituted glyoxylyl groups of the formula $R^y.CO.CO$— where $R^y$ is an aliphatic, araliphatic or aromatic group, e.g. a thienyl group, a phenyl group, or a mono-, di- or tri-substituted phenyl group, the substituents being, for example, one or more halogen atoms (F, Cl, Br, or I), methoxy groups, methyl groups or amino groups, or a fused benzene ring. Included in this group are also the α-carbonyl derivatives of the above substituted glyoxylyl groups.

(xiv) Formyl.

Where compounds of formula I are primarily intended for use as intermediates, important species of the group $R^1$ are:

(xv) Hydrocarbyloxycarbonyl and substituted hydrocarbyloxy groups (wherein the 7-amino group forms part of a urethane), e.g. lower alkoxycarbonyl groups (such as methoxycarbonyl, ethoxycarbonyl and t-butoxycarbonyl groups); halo lower alkoxycarbonyl groups e.g. 2,2,2-trichloroethoxycarbonyl; aralkoxycarbonyl groups such as benzyloxycarbonyl, 4-methoxybenzyloxycarbonyl, diphenylmethoxycarbonyl and 4-nitrobenzyloxycarbonyl groups; and cycloalkoxycarbonyl groups e.g. adamantyloxycarbonyl.

(xvi) Haloformyl e.g. chloroformyl.

An important group of compounds according to the invention are the compounds of the general formula

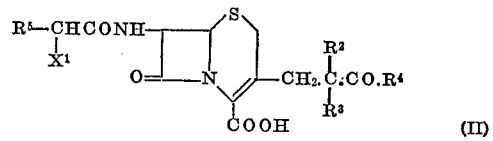

(II)

where $R^5$ is an aromatic group, e.g. phenyl or phenyl substituted with halo, hydroxy, lower alkyl, nitro, amino, lower alkanoyl, lower alkoxy or lower alkylmercapto; naphthyl; or a heterocyclic group, (particularly a 5- or 6-membered heterocyclic group containing at least one hetero atom selected from S, N and O, e.g. thien-2-yl or thien-3-yl); $X^1$ is amino; substituted amino e.g. acylamido; hydroxy; formyloxy; lower alkanoyloxy or hydrogen and $R^2$, $R^3$ and $R^4$ have the meanings defined above and physiologically acceptable derivatives thereof.

The compounds of general formula II wherein the corresponding acid $R^5 CH(X^1)COOH$ (where $R^5$ is phenyl or substituted phenyl and $X^1$ is amino or hydroxy) is of the D-series are of particular interest.

An important sub-group of compounds of formula II are the compounds of the general formula

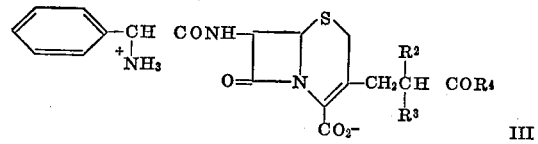

III wherein $R^2$, $R^3$, and $R^4$ have the above defined meanings and physiologically acceptable derivatives thereof.

An example of a compound of general formula III is 7β - (2 - amino-2-phenylacetamido)-3-(2-methyl-3-oxopentylceph-3-em-4-carboxylic acid of the formula:

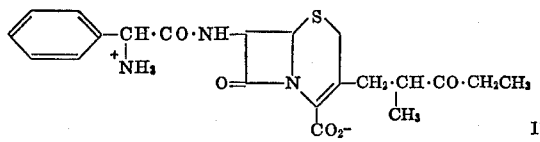

IV

7β - (D - 2-Amino-2-phenylacetamido)-3-(2-methyl-3-oxopentyl)ceph-3-em-4-carboxylic acid is a broad-spectrum antibiotic being active against gram-positive and gram-negative organisms as evidenced by *in vitro* tests. It is substantially resistant to degradation *in vivo* as evidenced by animal tests.

The compound of formula IV displays activity against *Staphylococcus aureus, E,. coli, Proteus mirabilis, Klebsiella aerogenes, Hafnia, Aerobacter cloacae* and *S. typhimurium*.

An important series of compounds related to those of formula III and IV are those having, at the 7-position, the group

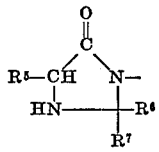

wherein $R^5$ has the above defined meaning and $R^6$ and $R^7$, which may be the same or different, are lower alkyl groups ($C_{1-4}$), particularly methyl or ethyl, or isomeric forms of said groups, and base salts thereof.

Salts which may be formed from the compounds according to the invention include (a) inorganic base salts such as alkali metal, e.g. sodium and potassium, alkaline earth e.g. calcium, and organic base salts e.g. procaine and dibenzylethylene diamine salts and (b) acid addition salts e.g. with hydrochloric, hydrogromic, sulphuric, nitric, phosphoric, toluene-p-sulphonic and methansulphonic acids. The salts may also be in the form of resinates, formed e.g. with a polystyrene resin containing amino, quaternary amino, or sulphonic acid groups, or a resin containing carboxyl groups e.g. a polyacrylic acid resin. The resin may if desired be cross-linked, e.g. it may be a copolymer of styrene and divinylbenzene containing the appropriate groups.

The novel compounds according to the invention may be prepared by a process which comprises (A) Acylating a compound of the formula

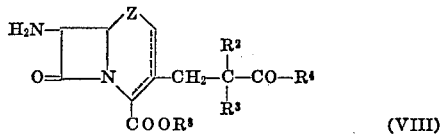

(VIII)

(wherein $R^8$ is hydrogen or a carboxyl-blocking group; Z is >S, or >S→O (α- or β-) and $R^2$, $R^3$ and $R^4$ have the above defined meanings with an acylating agent corresponding to the acid.

$R^1OH$ (wherein $R^1$ is a carboxylic acyl group) or (B) reacting a compound of the formula

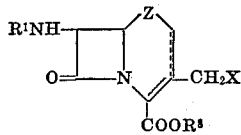

(IX)

(wherein $R^1$, $R^8$ and Z have the above-defined meanings and X is chlorine, bromine or iodine) with an enamine of the formula

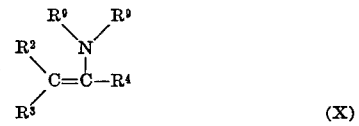

(X)

(wherein $R^2$, $R^3$ and $R^4$ have the above-defined meanings and the $R^9$ groups, which may be the same or different, are either lower alkyl groups or a divalent aliphatic group (preferably $C_4$ or $C_5$) which together with the adjacent nitrogen atom forms a heterocyclic ring) and contacting the resultant reaction mixture with an aqueous medium e.g. water or (C) reacting a compound of the formula

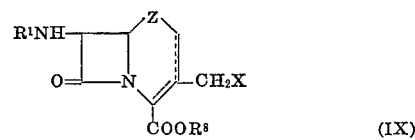

(IX)

(wherein $R^1$, $R^8$, Z and X have the above-defined meanings) with an anion which may be represented by a carbanion of the formula

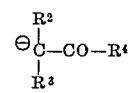

(wherein $R^2$, $R^3$ and $R^4$ have the above-defined meanings) whereafter, if necessary, any of the following reactions (D) are carried out; (i) conversion of a $\Delta^2$ isomer into the desired $\Delta^3$ isomer, (ii) removal of any groups protecting any amino or carboxyl groups and (iii) reduction of a compound in which is Z is >S→O to form the desired Z=>S compound.

For the sake of simplicity the group

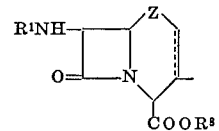

is represented below by Q—.

The invention will now be described in more detail with reference to reactions (A), (B), (C) and (D) above.

(A) Acylation

The acylation may be effected with any convenient acylation agent such as for example, an acid halide (e.g. chloride or bromide), an anhydride or mixed anhydride, e.g. with pivalic acid or formed with a haloformate, e.g. a lower alkylhaloformate, or an active ester or azide; alternatively, the acid itself can be used, together with an esterifying agent, e.g. carbonyldiimidazole or a carbodiimide such as N,N'-diethyl-, dipropyl-, diisopropyl-carbodiimide, or preferably N,N'- dicyclohexyl-carbodiimide.

The cephalosporin compound may be employed as the free 4-COOH compound or a form having a blocking group at the 4-position e.g. an ester with an alcohol or phenol which may readily be split off, e.g. by hydrolysis or reduction, at a later stage of the reaction, or as an acid addition salt, e.g. with nitric acid or a hydrocarbyl sulphonic acid, of the free 4-COOH compound or ester thereof. Examples of hydrocarbyl sulphonic acids include alkylbenzene sulphonic acids, e.g. p-toluene sulphonic acid, and lower alkane sulphonic acids, e.g. methane sulphonic acid.

The group protecting the 4-carboxyl group may be formed with an alcohol (aliphatic or araliphatic), phenol, silanol, stannanol or acid which may readily be split off at a later stage of the reaction.

Suitable esters thus include compounds containing as 4-ester group, a group selected from the following list which is not intended to be an exhaustive list of possible ester groups (i) —COOCR$^a$R$^b$R$^c$ wherein at least one of R$^a$, R$^b$ and R$^c$ is an electron-donor e.g. p-methoxyphenyl, 2,4,6-trimethylphenyl, 9-anthryl, methoxy, acetoxy, tetrahydrofur-2-yl, tetrahydropyran-2-yl or fur-2-yl. The remaining R$^a$, R$^b$ and R$^c$ groups may be hydrogen or organic substituting groups. Suitable ester groups of this type include p-methoxybenzyloxycarbonyl and 2,4,6-trimethylbenzyloxycarbonyl.

(ii) —COOCR$^a$R$^b$R$^c$ wherein at least one of R$^a$, R$^b$ and R$^c$ is an electron-attracting group e.g. benzoyl, p-nitrophenyl, 4-pyridyl, trichloromethyl, tribromoethyl, iodomethyl, cyanomethyl, ethoxycarbonylmethyl, arylsulphonylmethyl, 2-dimethylsulphoniumethyl, o-nitrophenyl or cyano. The remaining R$^a$, R$^b$ and R$^c$ groups may be hydrogen or organic substituting groups. Suitable esters of this type include benzoylmethoxycarbonyl, p-nitrobenzyloxycarbonyl, 4-pyridylmethoxycarbonyl, 2,2,2-trichloroethoxycarbonyl and 2,2,2-tribromoethoxycarbonyl.

(iii) —COOCR$^a$R$^b$R$^c$ wherein at least two of R$^a$, R$^b$ and R$^c$ are hydrocarbon such as alkyl e.g. methyl or ethyl, or aryl e.g. phenyl and the remaining R$^a$, R$^b$ and R$^c$ group, if there is one, is hydrogen. Suitable esters of this type include, t-butyloxycarbonyl, t-amyloxycarbonyl, diphenylmethoxycarbonyl and triphenylmethoxycarbonyl.

(iv) —COOR$^d$ wherein R$^d$ is adamantyl, 2-benzyloxyphenyl, 4-methylthiophenyl or tetrahydropyran-2-yl.

Silyl esters may conveniently be prepared from a halosilane or a silazane of the formula $$R^4_3SiX; \quad R^4_2SiX_2; \quad R^4_3Si.NR^4_2; \quad R^4_3Si.NH.SiR^4_3;$$

$$R^4_3Si.NH.COR^4; \quad R^4_3Si.NH.CO.NH.SiR^4_3;$$

$$R^4NH.CO.NR^4.SiR^4_3;$$

or $$R^4C(OSiR^4_3):NSiR^4_3$$

where X is a halogen and the various groups R$^4$, which can be the same or different, represent hydrogen atoms or alkyl, e.g. methyl, ethyl, n-propyl, iso-propyl; aryl, e.g. phenyl; or aralkyl e.g. benzyl groups.

Preferred derivatives of silanols ares silyl chlorides such as for example trimethylchlorosilane and dimethyldichlorosilane.

The carboxyl groups may be regenerated from an ester by any of the usual methods; for example, acid- and base-catalysed hydrolysis (especially for silyl and stannyl esters) is generally applicable, as well as enzymically-catalysed hydrolyses; however, aqueous mixtures may be poor solvents for these compounds and they may cause isomerizations, rearrangements, side-reactions, and general destruction, so that special methods may be desirable. Five suitable methods of deesterification are:

(i) Reactions with Lewis acids: Suitable Lewis acids for reaction with the esters include trifluoroacetic acid, formic acid, hydrochloric acid in acetic acid, zinc bromide in benzene and aqueous solutions or suspensions of mercuric compounds. The reaction with the Lewis acid may be improved by addition of a nucleophile such as anisole.

(ii) Reduction: Suitable systems for effecting reduction are zinc/acetic acid, zinc/formic acid, zinc/lower alcohol, zinc/pyridine, palladised-charcoal and hydrogen, electrolysis, and sodium and liquid ammonia.

(iii) Attack by nucleophiles: Suitable nucleophiles are those containing a nucleophilic oxygen or sulphur atom for example alcohols, mercaptans, thiocyanates and water.

(iv) Oxidative methods: for example, which involve the use of hydrogen peroxide and acetic acid.

(v) Irradiation.

The acylation may be carried out in an aqueous medium, with an acid halide, for example in an aqueous solution of a water-miscible ketone such as acetone, or in an aqueous solution of tetrahydrofuran, preferably also in the presence of an acid binding agent. Suitable acid binding agents include tertiary amines such as triethylamine, dimethylformamide, dimethylaniline; inorganic bases such as calcium carbonate or sodium bicarbonate; and oxiranes which bind hydrogen halide liberated in the acylation reaction. The oxirane is preferably a lower-1,2-alkylene oxide e.g. ethylene oxide or propylene oxide.

The pH in the acylation is preferably maintained at from 5 to 7 during the reaction which may be carried out at temperatures of from $-30°$ to $+80°$ C., preferably from 0 to 25° C. The acylation may also be carried out in an organic solvent medium such as ethyl acetate by, for example, refluxing.

Alternatively the acylation may be effected with an acid halide or mixed anhydride under substantially anhydrous conditions in the liquid phase in an inert Lewis base (preferably one having a tertiary nitrogen atom) having a dielectric constant above 15 and preferably above 30 and containing a hydrogen halide acceptor. The reaction may be carried out on the free 4-COOH compound, on an ester thereof or on an acid addition salt e.g. the hydrogen p-toluene-sulphonate of the 4-COOH compound or ester thereof. One may employ an acid addition salt of said ester under the aforesaid anhydrous conditions since this derivative can be obtained in high yield from the N-deacylation step (see below). Thereafter, if desired, the ester group is removed. The acid halide is advantageously the chloride or bromide.

A further alternative technique for effecting acylation is to employ, as acylating agent, an α-aminoarylacetyl chloride having the free amino group protected as an acid addition salt preferably the hydrochloride.

According to a preferred embodiment of the process according to the invention there is provided a process for the preparation of compound of the formula

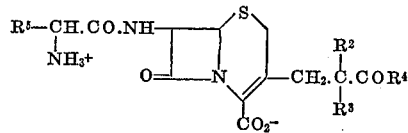

wherein R$^2$, R$^3$, R$^4$ and R$^5$ have the above-defined meaning, which comprises acylating a compound of the formula

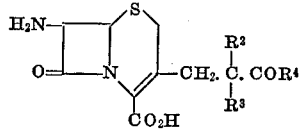

(or an ester, salt or salt-ester thereof) with a compound of the formula

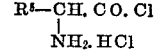

in the presence of an acid-binding agent.

Methods of effecting acylation under substantially anhydrous conditions are described more fully in British Patent Specification No. 1,104,937.

Generally speaking, methods of acylation which are known in peptide chemistry may be employed. For example, the 7-amino compound (VIII) may be converted, e.g. in situ, to the analogous 7-isocyanate compound prior to acylation with the acid R$^1$OH.

(B) Reactions with enamines

As stated above compounds of formula (I) may be prepared by reacting a compound of the formula $$Q—CH_2X \qquad (IX)$$

(where Q and X have the above-defined meanings) with an enamine of the formula

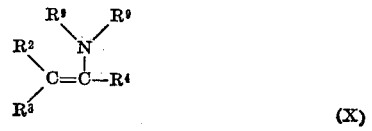

(X)

(wherein $R^2$, $R^3$, $R^4$ and $R^9$ have the above-defined meanings) and contacting the resultant reaction mixture with an aqueous medium, conveniently an aqueous acidic medium which also destroys any excess enamine.

Reactions of compounds of formula (IX) with the enamines proceed readily where X=I.

The 3-halomethylcephalosporins (IX) may be prepared by halogenation of a 7β-acylamido-3-methylceph-3-em-4-carboxylic acid ester 1β-oxide followed, if desired, by reduction of the 1β-oxide group as described in our Belgian Patent Specification No. 755,256. 3-Halomethyl-ceph-3-em compounds may also be prepared by the method described in Belgian Pat. No. 719,711. The corresponding ceph-2-em compounds may be prepared by the method of Dutch published Patent Application No. 6902013 by reaction of a ceph-2-em-3-methyl compound with N-bromo-succinimide to yield the ceph-2-em-3-bromomethyl compound.

The enamine may be formed by reaction of an amine $R^9_2NH$ with a carbonyl compound of the formula

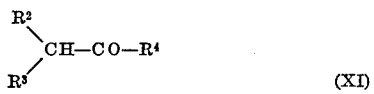
(XI)

(where $R^2$, $R^3$ and $R^4$ have the above-defined meanings).

The reaction of the 3-halomethyl cephalosporin compound with the enamine may conveniently be effected by maintaining the reactants in solution at a temperature of e.g. −80° to +100° C., preferably −20° to +90°. Reactions are usually complete within 15 minutes at 20° C. The reaction is advantageously effected using from one molar equivalent to five molar equivalents of the enamine. The excess enamine being rapidly destroyed by acid after the initial reaction is complete.

Reaction media which may be used include lower alkanoic acid nitriles e.g. acetonitrile or propionitrile; halogenated hydrocarbons e.g. methylene chloride, carbon tetrachloride, chloroform, ethylene dichloride or perchloroethylene; lower nitroalkanes, e.g. nitromethane; nitro-aromatic compounds, e.g. nitrobenzene; cyclic ethers e.g. dioxane or tetrahydrofuran; aromatic hydrocarbons e.g. benzene or toluene; amides of the general formula $R^c.CO.NR^d.R^e$ where $R^c$ is a hydrogen atom or an alkyl group containing 1 to 5 carbon atoms and $R^d$ and $R^e$, which may be the same or different, are each a hydrogen atom or an alkyl group containing 1 to 5 carbon atoms, or, alternatively $R^d$ and $R^e$ together form a divalent aliphatic group which together with the adjacent nitrogen atom, forms a heterocyclic ring. Examples of amides of this type include N,N-dimethylformamide, N,N-diethylformamide, and N,N-dimethylacetamide.

The course of the reaction may be followed by thin layer chromatography and by spectroscopic tests for the residue attached to the 3-position e.g. a new carbonyl frequency appears in the infra-red.

Since two reaction steps are involved a certain amount of trial and error experimentation is necessary to ascertain the completion of the first reaction before the addition of water or an aqueous medium. In general however since the first reaction proceeds quite rapidly this does not pose undue problems.

The reaction product may be separated from the reaction mixture which may contain, for example, unchanged cephalosporin and other substances, by a variety of processes including crystallization, ionophoresis, counter current separation, paper chromatography, thin layer chromatography e.g. by chromatography on ion-exchanges resins or silica gel.

(C) Reactions with carbanions

As stated above compounds of the formula (I) may be prepared by reacting a compound of the formula $$Q—CH_2X \qquad (IX)$$

(where Q and X have the above-defined meanings), particularly in the free carboxylic acid form, with an anion or equivalent nucleophile which may be represented by a carbanion of the formula

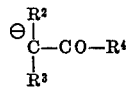

(where $R^2$, $R^3$ and $R^4$ have the above-defined meanings).

The required carbanions may be obtained from the conjugate acid of the formula

(XI)

by treatment with a base. The carbanion may be generated in situ in the process according to the invention by reaction of the conjugate acid with a base, preferably stronger than the carbanion. Suitable bases include alkali metal and alkaline earth metal hydroxides, carbonates and hydrogen carbonates e.g. sodium hydroxide or sodium hydrogen carbonate. Other bases which may be used to generate the carbanions include the conjugate bases of dimethylsulphoxide, dimethylacetamide, dimethylformamide and hexamethylphosphoramide; tertiary nitrogen bases e.g. pyridine or trialkylamines such as triethylamine; the sodio or lithio derivatives of hexamethyldisilazane; alkali metal hydrides, e.g. sodium hydride; alkali metal alkoxides; e.g. sodium t-butoxide; sodium triphenyl-methide; alkylene oxides (e.g. ethylene oxide or propylene oxide) which may be potentiated with halide ion; fluoride ion in an aprotic solvent. Enolic derivatives containing thallium (I) may also be used and we regard these as sources of the desired carbanions or equivalent nucleophiles.

While the carbanion may be generated with one equivalent of base it is preferable to employ about two equivalents when $R^8$=H, since, unless the group at the 4-position of the cephalosporin starting material is present as —$CO_2^-$, one equivalent of base will be required to generate the species —$CO_2^-$ and a second equivalent will required to generate the carbanion. It is not desirable to use more than about three equivalents of base when $R^8$=H since there will then be available anions that may complete with the carbanion in the process according to the invention.

The reaction may be carried out by stirring the components together, e.g. at a temperature of from −80° to +80° C., preferably from −10° to +35° C. When the reaction is effected at a temperature at which one or more reactants may volatilise a closed system may be used. The reaction may be effected in an inert or relatively inert solvent, for example, a halogenated hydrocarbon, e.g. methylene chloride; a hydrocarbon e.g. benzene or n-hexane; an acyclic or cyclic ether e.g. diethyl ether, tetrahydrofuran or dioxan; dimethylsulphoxide; an amide e.g. dimethylformamide or dimethylacetamide or hexamethylphosphoramide. The course of the reaction may be followed by thin-layer or paper chromatography and by ultra-violet spectroscopy (in general, the λmax shifts to higher wave-lengths, as the reaction produces chromophoric groups).

Protection of amino groups

When the 7β-acylamido group contains an amino group it will be necessary to protect this during the various reaction stages. The protecting group is conveniently one which can be removed by hydrolysis without affecting the rest of the molecule, especially the lactam and 7β-amido linkages. The amine protecting group and the esterifying group at the 4-COOH position can be removed using the same reagent. An advantageous procedure is to remove both groups at the last stage in the sequence. Protected amine groups include urethane, arylmethyl (e.g. trityl) amino, arylmethyleneamino, sulphenylamino or enamine types. Such groups can in general be removed by one or more reagents selected from dilute mineral acids e.g. dilute hydrochloric acid, concentrated organic acids, e.g. concentrated acetic acid, trifluoroacetic acid, and liquid hydrogen bromide at very low temperature, e.g. —80° C. A convenient protecting group is the t-butoxycarbonyl group, which is readily removed by hydrolysis with dilute mineral acid, e.g. dilute hydrochloric acid, or preferably with a strong acid (e.g. formic acid, trifluoroacetic acid or liquid HF) e.g. at a temperature of 0–40° C., preferably at room temperature (15–25° C.). Another convenient protecting group is the 2,2,2-trichloroethoxycarbonyl group which may be split off by an agent such as zinc/acetic acid, zinc/formic acid, zinc/lower alcohols or zinc/pyridine. The $NH_2$ group may also be protected as $NH_3^+$ by using the amino acid halide as its hydrohalide under conditions in which the amino group remains protonated. Typical protecting groups and their methods of removal are illustrated in the following table:

(wherein $R^1$ has the above-defined meaning). Acid addition salts e.g. with nitric acid or a hydrocarbyl sulphonic acid, may be formed with the free 4-COOH compound or ester thereof. Examples of hydrocarbyl sulphonic acids include alkylbenzene sulphonic acids, e.g. p-toluene sulphonic acid, and lower alkane sulphonic acids, e.g. methane sulphonic acid.

Suitable methods of N-deacylating cephalosporin derivatives having 7β-acylamido groups are described in British Pat. Nos. 1,041,985 and 1,119,806; Belgian Pat. No. 719,712 and in South African Patent Specification Nos. 68/5048 and 68/5327. Another method of N-deacylation which may be used is acid catalysis. For example, N-deformylation of a 7β-formamido group may be effected with a mineral acid at a temperature of minus 15° to +100° C., preferably +15 to 40° C. N-Deformylation may be effected with the aid of a Lewis acid in a lower alkanol, preferably under substantially anhydrous conditions.

| Type | Example | Usual name and analogues etc. | Usual method of removal |
|---|---|---|---|
| Urethane | HN-CO-OCH₂Ph | Benzyloxycarbonyl, p-methoxy | HBr/AcOH (Neat), CF₃COOH (Neat), liq. HBr at —80° C. |
| Do | HN-CO-OC(CH₃)₃ | t-Butoxycarbonyl | Dil. acid (HCl), CF₃COOH (Neat). |
| Do | HN-CO-OCHPh₂ | Diphenylmethoxycarbonyl | CF₃COOH (Neat), dil. HCl etc. |
| Do | HN-CO-O—(1-adamantyl) | 1-adamantyloxycarbonyl | Dil. HCl. |
| Arylmethyl | HN-CPh₃ | Trityl | AcOH plus H₂O, dil. HCl. |
| Sulphenyl | HN—S—C₆H₄—NO₂ | o-Nitrophenylsulphenyl, p-nitro- | Dil. HCl, NaI or Na₂S₂O₃·pH 2–4. |
| Enamine | (β-dicarbonyl enamine structure) | β-Dicarbonyl—R=OEt Ethyl acetoacetate; R=CH₃ Acetylacetone; R=Ph Benzoylacetone; R=OMe Methyl acetoacetate; R=C₂H₅ Propionylacetone and many other β-diketones. | Acid labile in varying degree Dil. AcOH or HCl etc. |
| Arylmethylene | HO-C₆H₄-N=CH | Anil (similar to β-dicarbonyl) from salicylaldehyde, 5-chlorosalicylaldehyde, 3,5-dichlorosalicylaldehyde, 2-hydroxy-1-naphthaldehyde, 3-hydroxy-pyridine-4-aldehyde. | Dil. HCl, formic acid. |
| Onium | NH₃⁺ | | Base. |
| Urethane | HN-CO-OCH₂CCl₃ | β,β,β-Trichloroethoxycarbonyl | Reducing agents e.g. Zn/acetic acid. |

N-Deacylation

The product of (B) or (C) may be N-deacylated to yield the corresponding 7β-amino compound.

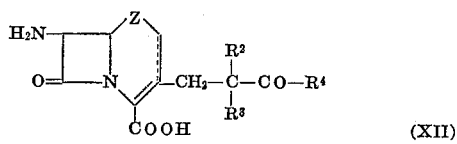

(XII)

(wherein $R^2$, $R^3$, $R^4$ and Z have the above-defined meanings) or a derivative (e.g. ester, salt or salt of ester) thereof and the 7β-amino compound subsequently acylated with an acylating agent corresponding to the acid $$R^1OH$$

(D) Subsequent reactions

Where the resultant compound contains a sulphinyl group at the 1-position this may be reduced by any convenient means. This may, for example, be effected by reduction of the corresponding acyloxysulphonium or alkyloxysulphonium salt prepared in situ by reaction with e.g. acetyl chloride in the case of an acetoxysulphonium salt, reduction being effected by, for example, sodium dithionite or by iodide ion as in a solution of potassium iodide in a water miscible solvent e.g. acetic acid, tetrahydrofuran, dioxan, dimethylformamide or dimethylacetamide. The reaction may be effected at a temperature of —20° to +50° C.

Alternatively, reduction of the 1-sulphinyl group may be effected by phosphorus trichloride or tribromide in solvents such as methylene chloride, dimethylformamide or tetrahydrofuran, preferably at a temperature of −20° C. to +50° C.

Where the resultant compound is a ceph-2-em compound, the desired ceph-3-em compound may be obtained by treatment of the former with a base e.g. a base of the type used in the generation of carbanions.

Removal of any groups protecting any amino or carboxyl groups may be effected as described above.

Administration

The compounds according to the invention may be formulated for administration in any convenient way, by analogy with other antibiotics and the invention therefore includes within its scope a pharmaceutical composition comprising a compound of formula I or a non-toxic derivative e.g. salt thereof (as herein defined) adapted for use in human or veterinary medicine. Such compositions may be presented for use in conventional manner with the aid of any necessary pharmaceutical carriers or excipients.

The invention therefore provides pharmaceutical compositions comprising a compound of formula I or a non-toxic derivative thereof (as herein defined) in association with a pharmaceutical carrier or excipient. The compositions may be presented in a form suitable for absorption by the gastro-intestinal tract. Tablets and capsules for oral administration may be in unit dose presentation form, and may contain conventional excipients such as binding agents, for example, syrup, acacia, gelatin, sorbitol, tragacanth, or polyvinylpyrrolidone; fillers, for example, lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets may be coated according to methods well known in the art. Oral liquid preparations may be in the form of aqueous or oily suspensions, solutions, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin, hydroxyethylcellulose, carboxymethyl cellulose, aluminium stearate gel or hydrogenated edible fats; emulsifying agents, for example, lecithin, sorbitan mono-oleate or acacia; non-aqueous vehicles which may include edible oils, for example, almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g. cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulatory agents such as suspending, stabilising and/or dispersing agents. Alternatively the active ingredient may be in powder form for reconstitution with a suitable vehicle, e.g. sterile, pyrogen-free water, before use.

The compositions may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules, in liquid or semi-solid form, or may be used as drops etc. Topical applications may be formulated in hydrophobic or hydrophilic bases as ointments, creams, lotions, paints, powders etc.

For veterinary medicine the composition, may, for example, be formulated as an intramammary preparation in either long acting or quick-release bases.

The compositions may contain from 0.1% upwards, preferably from 10–60% of the active material, depending on the method of administration. Where the compositions comprise dosage units, each unit will preferably contain 50–500 mg. of the active ingredient. The dosage as employed for adult human treatment will preferably range from 100–3000 mg. for instance 150 mg. per day, depending on the route and frequency of administration.

The compounds according to the invention may be administered in combination with other therapeutic agents such as antibiotics, for example cephalosporins, the penicillins or tetracyclines.

In order that the invention may be well understood the following Examples are given by way of illustration only.

In the Examples, unless otherwise stated (1) Ultra-violet (UV) spectra were measured on solutions in ethanol.

(2) Infra-red (IR) spectra were measured on mulls in Nujol.

(3) Optical rotations were determined at 19 to 30° at concentrations in the range 0.5 to 1.5% as solutions in dimethylsulphoxide. Where other solvents were used the same concentration range applied.

(4) Solutions were dried over anhydrous magnesium sulphate.

(5) All grades of Kieselgel were supplied by Merck AG Darmstadt, Germany.

(6) Proton magnetic resonance (PMR) spectra were determined at 60 or 100 mHz. The signs of the coupling constants (J) are not assigned. Signals are assigned as singlets (s) doublets (d), double doublets (dd), triplets (t), quartets (q) double quartets (dq), AB-quartets (AB-q), quintents (qu) and multiplets (m).

System A is descending n-propanol:water=7:3, on Whatman No. 1 Paper at room temperature.

System B is n-butanol:ethanol:water=4:1:5, equilibrated at room temperature, the upper phase being used as developer in descending manner, in equilibrium with lower phase, on Whatman 1 or 3MM paper buffered to pH 6 with 0.05M sodium dihydrogen phosphate.

System C is ethyl acetate: n-butanol: 0.1M-sodium acetate, pH 5=8:1:8, equilibrated at 38° C., the upper phase being used as developer in descending manner, in equilibrium with lower phase at 38°, on No. 1 Whatman paper buffered to pH 5 with 0.1M sodium acetate.

Light petroleum was the fraction, b.p. 40 to 60°. Methylene chloride was dried on Woelm Grade I basic alumina. Thin-layer chromatography was carried out upwards on Merck silica plates developed with benzene: ethyl acetate=4:1, or in these conditions.

System D.—Merck $GF_{254+366}$ plates, with the upper phase of solvent Mixture B for development.

System E.—On the plates of System D, with benzene: ethyl acetate=5:1 for development.

System F.—As System E, but with benzene:ethyl acetate=1:1 as solvent.

The abbreviations are used for the appearances of the spots: s, strong; m, medium; f, faint; v, very.

NMR spectra were measured at 60 and 100 mhz. Signs of the coupling constants cannot be attributed.

As far as possible, analytical values for solvates were confirmed by inspection for the appropriate features in the spectra.

$R_T$ represents the $R_F$ value divided by that of 3-acetoxymethyl-7β-(2 - thienylacetamido)ceph-3-em-4-carboxylic acid.

The conditions for electrophoresis are those described by Cocker et al., J. Chem. Soc. 1965, 5015.

Organic solutions were dried over desiccated magnesium sulphate.

EXAMPLE 1

(a) Diphenylmethyl 3-(2ξ-methyl-3-oxopentyl)-7β-(2-thienylacetamido)ceph-3-em-4-carboxylate A solution of diphenylmethyl 3-iodomethyl-7β-(2-thienylacetamido)ceph-3-em-4-carboxylate (8 g., 12.8 mmole)

in dry benzene (150 ml.) was treated with freshly distilled N-(pent-2-enyl)-pyrrolidine (8 ml., ca. 4 equivalents) and after 2 minutes at room temperature by a mixture of glacial acetic acid (25 ml.) in water (140 ml.), followed by acetone (75 ml.). The mixture was shaken until all the oil had dissolved, when the organic layer was separated and the aqueous layer extracted with ethyl acetate. The organic extracts were combined, dried by passing through magnesium sulphate, and their volume reduced to 25 ml. This solution was chromatographed on 0.05–0.2 mm. silica gel in benzene-ethyl acetate (10:1), and those fractions containing a substance giving a spot on thin-layer chromatography (silica gel $GF_{254}$ in benzene-ethyl acetate, 5:1), $R_F$ ca. 0.4, were bulked and evaporated to give a foam (4.8 g., 60%). The foam was dissolved in ethanol from which the *diphenylmethyl ester* separated as colourless prisms (1.5 g., 20%), m.p. 147–150°, $[\alpha]_D$ +26° (tetrahydrofuran), $\lambda_{infl.}$ 258 nm. ($\epsilon$ 6,200), $\nu_{max.}$ (CHBr₃) 3680 (H₂O) 3380 (NH), 1170 ($\beta$-lactam), 1715 (COOR), 1700 (C=O), and 1670 and 1505 cm.$^{-1}$(CONH), NMR (CDCl₃) $\tau$ 2.68

((P$\underline{h}$)₂CH—), 3.08 to 2.73 (3-proton m, 2-thienyl), 3.09 (ph₂C$\underline{H}$—), 3.32 (NH), 4.28 (dd, 7-H), 5.10 (d, J=4.5 Hz., 6-H), 6.18 (2-thienylmethyl), 6.68 and 6.93 (AB-q J=18 Hz., 2-H) 7.2–7.8 (5-proton envelope, C$\underline{H}_2$C$\underline{H}$(CH₃)

COC$\underline{H}_2$CH₃), and 9.14 (>CH.C$\underline{H}_3$) (Found: C, 64.2; H, 5.3; N, 4.5; S, 10.7. C₃₃H₃₂N₂O₅S₂.½H₂O requires: C, 64.2; H, 5.5; N, 4.7; S, 10.7%.)

(b) Sodium 3-(2ξ-methyl-3-oxopentyl)-7β-(2-thienylacetamido)-ceph-3-em-4-carboxylate A solution of diphenylmethyl 3-(2-methyl-3-oxopentyl)-7β-(2-thienylacetamido)ceph-3-em-4-carboxylate (2 g., 3.4 mmole) in trifluoroacetic acid (8 ml.) and anisole (3 ml.) was allowed to stand at room temperature for 5 minutes, and then the reagents removed under reduced pressure. The gum was dissolved in ethyl acetate and poured into light petroleum (b.p. 60 to 80°). The pale yellow solid was dissolved in ethyl acetate (5 ml.) and ether (20 ml.) and treated with 10% sodium 2-ethylhexanoate in acetone (5 ml.). The *sodium salt* separated as a pale yellow amorphous solids (700 mg., 46%), $[\alpha]_D$ +65° (H₂O), $\lambda_{max.}$ (H₂O) 234, 260 nm. ($\epsilon$ 13,200 and 7,900 respectively), $\nu_{max.}$ 3450 (H₂O), 3290 (NH), 1764 ($\beta$-lactam), 1700 (C=O), 1680 and 1540 (CONH), and 1600 cm.$^{-1}$ (COO⁻), NMR (D₂O), $\tau$ 2.65 to 2.98 (3-proton m, 2-thienyl), 4.48 (d, J=4.5 Hz., 7-H), 4.98 (d, 6-H) 6.13 (2-thienylmethyl), 6.49 and 6.90 (AB-q, J=18 Hz., 2-H), 6.91 to 7.82 (5-proton envelopes; C$\underline{H}_2$C$\underline{H}$(CH₃) COC$\underline{H}_2$CH₃), 8.92 (>CHC$\underline{H}_3$), and 9.05 (C$\underline{H}_2$C$\underline{H}_3$) (Found: C, 47.2; H, 4.9; N, 5.5; S, 13.3.

C₁₉H₂₁NaO₅S₂.2H₂O requires: C, 47.5; H, 5.2; N, 5.8; S, 13.4%.) $R_F$ 0.43 (System B), 0.62 (System C).

EXAMPLE 2

(a) Diphenylmethyl 7β-amino-3-(2ξ-methyl-3-oxopentyl) ceph-3-em-4-carboxylate, hydrogen p-toluenesulphonate A solution of diphenylmethyl 3-(2ξ-methyl-3-oxopentyl)-7β-(2-thienylacetamido)ceph-3-em-4-carboxylate (1.6 g., 2.72 mmole) and pyridine (2.7 ml., 33.5 mmole) in methylene chloride (30 ml.) was cooled to −10° and treated with a solution of phosphorus pentachloride (1.7 g., 8.15 mmole) in methylene chloride (35 ml.), over 15 minutes. The solution was stirred at −12° for 45 minutes. Methanol (27 ml.) was added at such a rate that the temperature did not rise above −10°, and when it had all been added, the temperature was raised to 20°. After standing for three hours the solution was cooled to 0° and treated with water (30 ml.) with vigorous stirring. The temperature was raised to 20° and stirring continued for 30 minutes. The organic layer was separated and washed with aqueous sodium bicarbonate, and then dried evaporated. A solution of the gum in ethyl acetate (20 ml.) and ether (30 ml.) was treated with p-toluenesulphonic acid hydrate (0.6 g., 3.2 mmole) in ethyl acetate (10 ml.). The *toluenesulphonate* separated as colourless needles (1.21 g., 69.5%), m.p. 174–176° (decomp.), $[\alpha]_D$ +5°

(CHCl₃), $\lambda_{max.}$ 259 nm. ($\epsilon$ 6,800), $\nu_{max.}$ 1778 ($\beta$-lactam), 1718 (COOH), and 1703 cm.$^{-1}$ (C=O), NMR (d₆-dimethylsulphoxide) $\tau$ 2.60 (P$\underline{h}_2$CH—), 2.47 and 2.86 (p

CH₃.C₆H₄SO₃⁻), 3.07 (Ph₂C$\underline{H}$), 4.68 (dd, 7-H), 4.86 (d, J=4.5 Hz., 6-H), 6.42 (broad s, 2-H), 7.2–7.6 (5-proton envelope, C$\underline{H}_2$C$\underline{H}$(CH₃)COC$\underline{H}_2$CH₃), 7.70 (p-C₃$\underline{H}$C₆H₄—), 9.10 (C$\underline{H}_2$C$\underline{H}_3$), 9.14 (>CHC$\underline{H}_3$) (Found: C, 61.8; H, 5.7; N, 4.2; S, 10.2 C₃₃H₃₆N₂O₇S₂·½H₂O requires: C, 61.4; H, 5.8; N, 4.3; S, 9.9%).

(b) 7β-(D-α-aminophenylacetamido)-3-(2ξ-methyl-3-oxopentyl)-ceph-3-em-4-carboxylic acid trifluoroacetate A solution of N-(t-butoxycarbonyl)-D-phenylglycine (0.93 g., 3.86 mmole) in tetrahydrofuran was cooled to −6° and treated with triethylamine (0.55 ml., 3.86 mmole), followed by isobutylchloroformate (0.53 g., 3.86 mmole), the temperature being maintained below −6°. After 30 minutes the triethylamine hydrochloride was filtered off and the filtrate was added to a solution of diphenylmethyl 7β-amino-3-(2-ξ-methyl - 3 - oxopentyl) ceph-3-em-4-carboxylate hydrogen p-toluenesulphonate (1.6 g., 2.5 mmole) in acetonitrile (10 ml.) and N,N-dimethylacetamide (5 ml.). After 30 minutes the acetonitrile was removed under reduced pressure. The residue was dissolved in ethyl acetate, washed with aqueous sodium hydrogen carbonate and water, and then dried and evaporated. The gum was treated with anisole (4 ml.) and trifluoroacetic acid (10 ml.) and, after 5 minutes, the reagents were removed under reduced pressure. The resulting oil was suspended in water (50 ml.) and treated with Amberlite LAl (OAc⁻) in ether (10%, 50 ml.). After shaking, the aqueous layer was separated and washed with ether and ethyl acetate, and then freeze-dried to give the *title compound* as a pale yellow solid (0.92 g., 85%), $[\alpha]_D$ +75° (acetone:water=1:1), $\lambda_{max.}$ (H₂O) 261 nm. ($\epsilon$ 7,100), $\nu_{max.}$ 1765 ($\beta$-lactam), 1680 (CONH), 1620 cm.$^{-1}$ (COO⁻), NMR (D₂O), $\tau$ 2.50 (C₆H₅), 4.39 (d, J=4.5 Hz., 7-H), 4.92 (d, J=4.5 Hz., 6-H), 4.75

($_6$H₅CH($\overset{+}{N}$H₃)), 6.55, 6.92 (AB-q, J=18 Hz., 2-H), 6.90 to 7.55 (5-proton envelope (C$\underline{H}_2$CH(CH₃)COC$\underline{H}_2$CH₃), 8.96

(>CHC$\underline{H}_3$), and 9.04 (CH₂C$\underline{H}_3$)·$R_F$ 0.15 (System B), 0.08 (System C).

(c) 7β-(D-2-aminophenylacetamido)-3-(2ξ-methyl-3-oxopentyl)-ceph-3-em-4-carboxylic acid A solution of N-(t-butoxycarbonyl)-D-phenylglycine (5.83 g., 22 mmole) in dry tetrahydrofuran (60 ml.) was cooled to −10° and treated with triethylamine (3.05 ml., 22 mmole), followed by isobutylchloroformate (3.004 g., 22 mmole) in dry tetrahydrofuran (10 ml.), the temperature being maintained below −6°. The temperature was raised to 20° and the white suspension stirred for 30 minutes. The precipitated triethylamine hydrochloride was filtered off and the filtrate added, over 5 minutes, to a stirred solution of diphenylmethyl 7β-amino-3-(2ξ-methyl-3-oxopentyl)ceph-3 - em - 4 - carboxylate hydrogen-p-toluenesulphonate (9.11 g., 14.3 mmole) in acetonitrile (60 ml.) and N,N-dimethylacetamide (30 ml.). After 30 minutes the solvents were removed at 40° (2 mm.) and the residue dissolved in ethyl acetate (250 ml.). The solution was washed with aqueous sodium bicarbonate (2× 50 ml.), water (2× 50), and brine (50 ml.) and dried and evaporated to give a pale yellow foam (10.68 g.). The foam was treated with anisole (20 ml.) and trifluoroacetic acid (50 ml.), and, after 5 minutes, the reagents removed at 30° (2 mm.). The resulting oil was suspended in water (800 ml.) and treated with Amberlite LA 1(OAc⁻) in ether (10%, 500 ml.). After shaking, the insoluble material (440 mg.) was filtered off and the aqueous layer separated and washed with ether (3× 200 ml.) and ethyl acetate (3× 200 ml.), and then freeze-dried to give a pale yellow solid (5.74 g.). This material was triturated with ether (200 ml.) to give the *title compound* (5.315 g., 86%) as a pale yellow solid, $[\alpha]_D$ +71° (acetone: water=1:1), $\lambda_{max.}$ (0.1 M-pH 6 phosphate buffer) 262.5 nm. ($\epsilon$ 6,600), $\nu_{max.}$ 1760 ($\beta$-lactam), 1700 (ketone) and 1600 cm.⁻¹ (—$CO_2^-$), $\tau$ ($D_2O$ with trifluoroacetic acid) 2.50 ($C_6H_5$—), 4.39 (d, J 4.5 Hz,, $C_7$-H), 4.92 (d, J 45 Hz., $C_6$-H), 4.75 (PhC$\underline{H}$—), 6.62 and 6.85 (AB-q, J 18 Hz., $C_2$—H), 6.90–7.60 ($C\underline{H}_2$ $C\underline{H}(CH_3)COC\underline{H}_2CH_3$), 8.84–9.10 (envelope, —$COCH_2C\underline{H}_3$ and >$CHC\underline{H}_3$). (Found: C, 56.8; H, 5.9; N, 6.3; S, 6.3. $C_{21}H_{25}N_3O_5S$ requires C, 58.5; H, 5.8; N, 9.7; S, 7.4%.)

EXAMPLE 3

3-(2ξ-Ethoxycarbonyl-3-oxobutyl)-7β-(2-thienyl-acetamido)ceph-3-em-4-carboxylic acid A solution of ethyl acetoacetate (17.5 g., 135 mmole, 5 equiv.) in freshly dried peroxide-free tetrahydrofuran (50 ml.) was added dropwise with stirring, at below 35°, to a suspension of sodium hydride (3.81 g. of a 45% dispersion in mineral oil, 71.5 mmole, 2.7 equiv.) in tetrahydrofuran (10 ml.). After 30 minutes the addition was over, and the solution was stirred for a further 15 minutes, and was then added dropwise with stirring during 25 minutes, at less than 17°, to a solution of 3-chloromethyl-7β-(2-thienylacetamido)ceph - 3 - em-4-carboxylic acid (9.8 g., 26.3 mmole) in freshly dried tetrahydrofuran (150 ml.). The pale orange-red solution was stirred at 17° for a further 30 minutes, then was added to N-hydrochloric acid (100 ml.). The tetrahydrofuran was evaporated, the pH taken to 8.0 and the solution was washed with ethyl acetate. The aqueous layer was acidified to pH 2.0 and was extracted into ethyl acetate which was washed, dried partially evaporated and added to a large volume of petroleum spirit (b.p. 60° to 80°) to give nearly white curds (8.6 g. 70%), m.p. 59 to 80° (decomp.), $[\alpha]_D$ +36° ($CHCl_3$), $\lambda_{max.}$ 238 nm. ($\epsilon$ 12,000) inflection at 260 nm. ($\epsilon$ 6,600); a sample purified via its sodium salt had m.p. 115–125° (decomp). $\lambda_{max.}$ (0.1M-phosphate, pH 6) 236 nm. ($\epsilon$ 13,800), inflection at 260 nm., ($\epsilon$ 8,350), $\nu_{max.}$ ($CHBr_3$), 3400 (NH), 1775 ($\beta$-lactam), 1730 to 1700 ($CO_2R$, $CO_2H$, and COMe), 1680 and 1510 cm.⁻¹ (CONH), $\tau$ (60 mHz.; and 100 mHz.;

$D_2O$—$NaHCO_3$)

2.65 to 3.03 (approx. 3-proton m; 2-thienyl), 4.47 (1-proton d, J 5 Hz.; $C_7$—H), 5.0 (1-prton d, J 5 Hz.; $C_6$—H), 5.85 (2-proton m; $OCH_2$—Me), 6.12 (2-proton s; $CH_2$—CO), 6.49, 6.45 and 6.85 (2-protons, 2 superimposed AB-q, J 17 Hz.; $C_2$—$CH_2$) 6.72, 6.78 and 7.39 (two superimposed AB-q, J 14 Hz.; $C_3$—$CH_2$), 7.71 and 7.74 (3-protons, two s; COMe), 8.76 (3-protons, 2 t, J 7Hz., separated by ca. 0.5 Hz.; O—$CH_2$—$C\underline{H}_3$), (Found: C, 51.7; H, 5.0; N, 5.6; S, 13.2 and 13.1. $C_{20}H_{22}N_2O_7S_2$ (466.53) requires C, 51.5; H, 4.9; N, 6.0; S, 13.75%.) $R_f$ 0.6 (system C, 0.2 mg. loading), 0.6 (system B, 0.2 mg. loading), 0.45 (system D, 0.1 mg. loading). The compound gave a red-brown colour with 1% methanolic ferric chloride.

EXAMPLE 4

(a) 3-Chloromethyl-7β-(2-thienylacetamido)ceph-3-em-4-carboxylic acid

Diphenylmethyl 3 - chloromethyl-7β-(2-thienylacetamido)ceph-3-em-4-carboxylate (2.223 g., 4.1 mmole) was suspended in anisole (2 ml.) and treated with trifluoroacetic acid (8 ml.) during 4 minutes at 20°. The solution was evaporated at 40°/2 mm. to give an oil which was triturated with ethyl acetate and filtered, yielding a pale yellow solution.. The solution was evaporated to 12 ml. and added dropwise with stirring to petroleum spirit (500 ml.), giving a pale yellow solid (1.126 g.) $\lambda_{max.}$ 235 nm.

($E^{1\%}_{1cm.}$ 324), 260 nm.

($E^{1\%}_{1cm.}$ 169.)

From the UV and NMR spectra this material appeared to be about 80% pure.

A solution of the yellow solid in ethyl acetate was treated with 5 volumes of ether. The suspension was filtered, decolourised with charcoal, and evaporated to 2–3 ml.

Ether (1 ml.) was added and scratching the inside wall of the flask with a spatula initiated crystallisation of white needles (257 mg.). The filtrate was added dropwise to petroleum spirit to give a solid (373 mg.).

The crystalline sample had mp 40.5–51.5° (dec.), $[\alpha]_D$ —4.45° (tetrahydrofuran), $\lambda_{max.}$ (tetrahydrofuran) 269 nm. ($\epsilon$ 8,600), $\lambda_{max.}$ 235 nm. ($\epsilon$ 9,800) with an inflexion at 260 nm. ($\epsilon$ 3,700) $\nu_{max.}$ 3310 (NH), 1775 ($\beta$-lactam), 1725 and 1698 ($CO_2H$), 1760–1655 and 1533 cm.⁻¹ (CONH), $\tau$ ($CDCl_3$ with 2 drops DMSO-d⁶; 60 mHz.) 1.3 (approx. 1-proton s, $CO_2H$), 1.8 (2-proton d, J=9 H².; CON$\underline{H}$ 2.7 to 3.1 (3-proton m, thienyl), 4.22 (1-proton dd, J=5 and 9 Hz.; 7-H) 4.99 (1-proton d, J=5 Hz.; 6-H), 5.45 (2-proton s, $CH_2$—Cl), 6.20 (2-protons s, $CH_2CO$), 6.45 (2-proton broad s, 2-$CH_2$). A sample contained anisole (0.5 mole, by NMR) (Found: C, 48.7; H, 4.4; N, 6.1: Cl, 8.8. $C_{14}H_{13}ClN_2O_4S_2$.½PhOMe requires C, 49.0; H, 4.0; N, 6.5; Cl, 8.3%.) It had these chromatographic properties: $R_F$ 0.68 (m), 0.45 (m), 0.4 (m), 0.2 (m) (System D.); 0.93 (s), 0.07 (m) (System C); 0.55–0.3 (m), 0.16 (m) (System B). The compound is unstable in aqueous and alcoholic solvents.

(b) 3-(2-Acetyl-3-oxobutyl)-7β-(2-thienylacetamido) ceph-3-em-4-carboxylic acid

Acetyl acetone (7.223 g., 72.2 mmole, 5 equiv.) was dissolved in freshly dried peroxide-free tetrahydrofuran (65 ml.) and added slowly, with stirring, at 30° to sodium hydride (1.95 g., of 45% dispersion, 36.7 mmole, 2.5 equiv.) in freshly dried tetrahydrofuran (60 ml.). The white suspension was added dropwise with stirring to 3-chloromethyl-7β-(2-thienylacetamido)ceph - 3 - em-4-carboxylic acid (5.4 g., 14.5 mmole) in freshly dried tetrahydrofuran (125 ml.) during 10 minutes at 25°. After 90 minutes the reaction mixture was poured on to N-hydrochloric acid (40 ml.) and evaporated to remove the tetrahydrofuran. Ethyl acetate was added and the solution was washed at pH 8.0. The aqueous layer was acidified to pH 2.0 and extracted into ethyl acetate, which was washed, dried and evaporated to give a foam (4 g.). The foam was dissolved in acetone, and treated with sodium 2-ethylhexanoate (1 equivalent in acetone; 10 ml.). Slow addition of ether gave the *title compound*, as its *sodium salt*, m.p. 123–130° (decomp.), $[\alpha]_D$ —43.8° (water), $\lambda\lambda_{max.}$ (0.1M-pH 6 phosphate) 236 nm. ($\epsilon$ 14,000) and 263 nm. ($\epsilon$ 8000) (addition of 1 drop N-sodium hydroxide gave a new maximum at 312 nm. ($\epsilon$ 10,000), which could be ascribed to an enolate chromophore), $\nu_{max.}$ ($CHBr_3$) 1755 ($\beta$-lactam), 1690 (COMe, amide), 1520 amide cm.⁻¹, $\tau$ ($D_2O$ with $NaHCO_3$) 2.6–3.0 (3-proton m., thienyl), 4.47 (1-proton d, J=5 Hz.; 7-H), 4.99 (1-proton d, J=5 Hz.; 6-H), 6.12 (2-proton s, $CH_2CO$), 6.5 and 6.88 (2 protons approx., 2 d, J=18 Hz.; 2-$CH_2$), 6.81 and 7.43 (approx. 2 protons, 2 d, J=14 Hz.; 3-$CH_2$), 7.71 and 7.75 (about 5.5 protons, 2 s, possibly 2 COMe groups, magnetically non-equivalent), 7.88 (approx. 0.5-proton, possibly —C=C—Me of enol form); the NMR spectrum in $D_2O$ was less clear. In $CDCl_3$ the spectrum of the acid was complex and gave evidence of 30 to 40% of the enol form. (Found: C, 48.8; H, 4.2; N, 5.6; Na, 5.0; S, 13.4. $C_{19}H_{19}N_2NaO_6S_2.\frac{1}{2}H_2O$ requires C, 49.0; H, 4.3; N, 6.02; Na, 4.9; S, 13.7%.) $R_F$ 0.43 (System B), 0.13 (f), 0.38 (s) (System C), 0.40 (System D). The compound gave a brown colour with a 1%-solution of anhydrous ferric chloride in methanol.

EXAMPLE 5

3-(2ξ-t-Butoxycarbonyl-3-oxobutyl)-7β-thienylacet-amido)ceph-3-em-4-carboxylic acid A solution of t-butyl acetoacetate (7.914 g., 50 mmole, 3.4 equiv.) in freshly dried tetrahydrofuran (25 ml.) was added with stirring at less than 35° to a suspension of sodium hydride (1.63 g. of 40% dispersion, 27 mmole, 1.85 equiv. Insufficient material used in error; normally 2.3 to 2.7 equiv. would be used) in tetrahydrofuran (5 ml.). The solution was stirred at 20° for 20 minutes, then added dropwise at 20° to a stirred solution of 3-chloromethyl-7β-(2-thienylacetamido)ceph-3-em - 4 - carboxylic acid (5.454 g., 14.6 mmole) in tetrahydrofuran (85 ml.). The addition took 15 minutes, and the reaction-mixture was stirred for a further 35 minutes before being poured into N-hydrochloric acid (50 ml., excess).

The tetrahydrofuran was evaporated, and the aqueous layer was washed with ethyl acetate at pH 7.8 before it was extracted into ethyl acetate at pH 2.5. The organic layer was washed, dried, and evaporated to give a foam (4.988 g.), which was dissolved in ethyl acetate and added to a large volume of petroleum spirit (b.p. 60 to 80°) to give the *keto-ester* as a nearly colourless powder (4.084 g., 57%), m.p. 80 to 92° (decomp.), $[\alpha]_D$ +25°. ($CHCl_3$), $\lambda_{max.}$ (0.1M-pH 6 phosphate) 236.5 nm. (ε 13,600), inflection at 260 nm. (ε 8,050), $\lambda_{max.}$ 237 nm. (ε 14,000), inflection at 260 nm. (ε 7,200), $\nu_{max.}$ 3500 ($H_2O$), 3300 (NH), 1776 (β-lactam), 1728 ($CO_2R$), 1710 (COMe) 1670 and 1530 cm.$^{-1}$ (CONH), τ (100 mHz.; all $D_2O$—$NaHCO_3$). 2.7 to 3.1 (3-proton m; 2-thienyl), 4.41 (1-proton, 2 d, J 5 Hz.; $C_7$—H), 4.8 (0.5-proton s; unassigned), 4.98 (1-proton 2 d, J 5 Hz.; $C_6$—H), 6.11 (2-proton broad s; $CH_2CO$), 6.2 to 7.5 (approx. 4 protons, ill-resolved m; $C_2$—$CH_2$ and $C_3$—$CH_2$), 7.70 and 7.73 (2.5 protons, 2 s; 2 types of COMe), 7.85 (0.5-proton s; C=C—Me of enol), 8.53 (9-proton s; $CO_2Bu$-t) [Found: C, 52.4; H, 5.5; N, 5.3; S, 13.2. $C_{22}H_{26}N_2O_7S_2$. 0.5 $H_2O$ (494.58) requires C, 52.5; H, 5.4; N, 5.6; S, 12.8%.] $R_f$ 0.45 (system B, 0.22 mg. loading), $R_T$ 2.2 (system C 0.2 mg. loading), $R_f$ 0.25 (f), 0.5 (s) (System D, 0.1 mg. loading), 0.0 (Merck plate developed by ethyl acetate).

EXAMPLE 6

3-(2ξ-Diphenylmethoxycarbonyl-3-oxobutyl)-7β-(2-thienylacetamido)ceph-3-em-4-carboxylic acid A solution of diphenylmethyl acetoacetate (12.149 g., 45.5 mmole 2.9 equiv.) in freshly dried peroxide-free tetrahydrofuran (50 ml.) was added dropwise with stirring at 25 to 30° to a suspension of sodium hydride (2.162 g. of 45% dispersion, 40.6 mmole, 2.6 equiv.) in tetrahydrofuran (10 ml.) during 20 minutes. The yellow solution was added to a stirred solution of 3-chloromethyl-7β-(2-thienylacetamido)ceph-3-em-4- carboxylic acid (5.849 g., 15.7 mmole) in tetrahydrofuran (150 ml.) at 25°. The addition took 25 minutes and the pale-yellow solution was stirred for a further 25 minutes before being poured into 2N-hydrochloric acid (45 ml.).

The solution was evaporated and extracted with ethyl acetate at pH 7.8. The organic phase was washed, dried, partially evaporated and added to a large volume of petroleum spirit to give white curds (5.947 g. 63%), m.p. 95 to 106° (decomp.), $[\alpha]_D$ +8° ($CHCl_3$), $\lambda\lambda_{inflection}$ 235 nm. (ε 13,500) and 260 nm. (ε 8,100), $\nu_{max.}$ ($CHBr_3$) 3600 to 3400 ($H_2O$), 3300 (NH), 1760 (β-lactam) 1700 to 1670 (CONH, $CO_2H$, COR), 1590 (CONH), and 769 cm.$^{-1}$ (Ph), τ (60 mHz; $C_5D_5N$) 6.2 (2-proton s; $CH_2CO$), 7.85 (3-proton s) (all other signals were too weak to assign), (60 mHz.; $D_3CSOCD_3$) 2.61 (10-proton s; $Ph_2$), 2.6 to 3.05 (3-proton m; 2-thienyl), 3.15 (1 proton s, $CHPh_2$), 4.40 (1-proton unresolved m; $C_7$—H), 5.12 (1-proton unresolved m; $C_6$—H), 6.2 (2-proton s; $CH_2CO$), 6.2 to 6.8 ($C_2$—$CH_2$, $C_3$—$CH_2$ and $H_2O$ in $D_3CSOCD_3$), 7.79 (3-proton s; COMe). (Found: C, 60.65; H, 4.6; N, 4.4; S, 9.6. $C_{31}H_{28}N_2O_7S_2$ (604.68). 0.5 $H_2O$ requires C, 60.6; H, 4.8; N, 4.6; S, 10.4%) $R_f$ 0.35 (vf), 0.55 (s), 0.75 (f) (system B, 0.2 mg., loading), 0.9 (system C, 0.2 mg. loading), 0.4 (s), 0.65 (f), 0.75 (mf) (system D, 0.1 mg. loading), 0.0 (Merck plates, developed by ethyl acetate.)

EXAMPLE 7

Reaction between 3-chloromethyl - 7β-(2-thionylacet-amido)ceph-3-em-4-carboxylic acid and thallous salts of β-keto compounds (A) Salt of ethyl benzoylacetate: The thallous salt of ethyl benzylacetate (255 mg., 0.625 mmole, 2.5 equiv.) was added to a stirred solution of 3-chloro-methyl-7β-(2-thienylacetamido)ceph - 3 - em-4-carboxylic acid (107 mg., 0.27 mmole) in dry tetrahydrofuran (1 ml.) at 25°. A solid was immediately precipitated and the suspension was brown after 5 minutes. After 4 hours chromatography (system C) showed a medium intensity spot with the $R_f$ (0.65) of 3-(2ξ-benzoyl-2ξ-ethoxycar-bonylethyl) - 7β - (2-thienylacetamido)ceph-3-em-4-car-boxylic acid and an intense spot, $R_f$ 0.0.

(B) Salt of acetylacetone: The experiment was similar to (A) and gave a product which on chromatography in (system C) had a medium intensity spot with the $R_f$ (0.6) of 3-(2ξ-acetyl-3-oxobutyl)7β-(2-thienylacetamido) ceph-3-em-4-carboxylic acid and an intense spot, $R_f$ 0.0.

(C) Salt of ethyl acetoacetate: The experiment was similar to A and gave a product which on chromatography (system C) had a medium intensity spot with the $R_f$ (0.8) of 3-(2ξ-ethoxycarbonyl-3-oxobutyl)-7β-(2-thienylacetamido)ceph-3-em-4-carboxylic acid and an intense spot, $R_f$ 0.0.

EXAMPLE 8

(a) Diphenylmethyl 3-(2ξ-methyl-3-oxopentyl)-7β-(2-thienylacetamido)ceph-3 - em-4 - carboxylate, second isomer Diphenylmethyl 3-iodomethyl-7β-(2-thienylacetamido) ceph-3-em-4-carboxylate (8 g., 12.8 mmole) was treated with N-(pent-2-enyl)-pyrrolidine (8 ml., ca. 4 equivalents) in dry benzene (160 ml.), by the method of example 1(a) to give, after purification by chromatography on Merck 0.05–0.2 mm. silica gel, a foam (1.079 g., 14.4%). This foam was dissolved in ethanol (10 ml.), and the solution cooled to give the *diphenylmethyl ester, first isomer* (310 mg., 4%) as colourless needles, m.p. 145° (decomp.), $[\alpha]_D^{23}$ +20° (c. 1.06, $CHCl_3$), $\lambda_{inflex.}$ (EtOH) 260 nm. (ε 6,800). [The IR and NMR spectra of this material were identical to those described in the example 1(a).] The residual ethanol solution was evaporated to a foam (700 mg.) which was dissolved in ethyl acetate, and the solution run into petroleum ether to give the *second isomer* as a white, amorphous solid (495 mg., 6.6%). A pure sample of the *second isomer* was obtained by combination of the amorphous products obtained from a number of such reactions, and purification by further chromatography on Merck 0.05–0.2 mm. silica gel, with benzene:ethyl acetate=10:1 as eluant. The foam obtaned by evaporation of those fractions with $R_f$ 0.4 (thin-layer chromatography, silica gel $GF_{254}$, developed with benzene: ethyl acetate=5:1) was dissolved in ethyl acetate, and the solution run into petroleum ether to give an amorphous solid, m.p. 56 to 70° (decomp.), $[\alpha]_D^{23}$ −3.4° (c. 1.1, $CHCl_3$), $\lambda_{inflex.}$ (EtOH) 260 nm.

(ε 6,900) ν<sub>max.</sub> (CHBr<sub>3</sub>) 3380 (NH), 1770 (β-lactam), 1715 (CO<sub>2</sub>R), 1700 (C=O), and 1670 and 1505 cm.<sup>-1</sup> (—CONH); the PMR spectrum (CDCl<sub>3</sub>) indicated that this material was essentially the *second isomer*, with signals at τ 2.69 [Ph<sub>2</sub>C$\underline{H}$—], 2.73 to 3.08 (3-proton multiplet, 2 thienyl), 3.09 (Ph<sub>2</sub>C$\underline{H}$), 3.32 (—NH, doublet, J 9 Hz.), 4.29 (C<sub>7</sub>-H, double doublet, J 5 and 9 Hz), 5.10 (C<sub>6</sub>-H, doublet, J 5 Hz.) 6.18 (2-thienylmethyl), 6.73 (C<sub>2</sub>-H, two-proton singlet), 7.2 to 7.9

(—C$\underline{H}$<sub>2</sub>CH(CH<sub>3</sub>)COC$\underline{H}$<sub>2</sub>CH<sub>3</sub>, 5-proton envelope), 8.79 (CHC$\underline{H}$<sub>3</sub>, doublet, J 6 Hz.), and 9.02 (—CH<sub>2</sub>C$\underline{H}$<sub>3</sub>, triplet, J 7 Hz.), together with a small amount (10 to 15%) of the *first isomers*, characterised by signals at 6.68 and 6.93 (C<sub>2</sub>—H, AB-quartet, J 18 Hz.). [Found: C, 65.1; H, 5.4; N, 4.5; S, 11.2.

C<sub>32</sub>H<sub>32</sub>N<sub>2</sub>O<sub>5</sub>S<sub>2</sub>

(588.7) requires C, 65.3; H, 5.5; N, 4.8; S, 10.9%.[

(b) Diphenylmethyl 7β-amino-3-(2ξ-methyl-3-oxopentyl)ceph-3-em-4-carboxylate, hydrogen p-toluenesulphonate second isomer The product of part (a) (8.0 g., 13.6 mmole) was treated with pyridine (12.8 ml., 160.8 mmole.) and phosphorous pentachloride (8.52 g., 40.8 mmole.) in dry methylene chloride (320 ml.), followed by methanol (140 ml.), by the method of example 2(a) to gve an oily gum (10.69 g.). A solution of the gum in ethyl acetate (30 ml.) and ether (60 ml.) was treated with p-toluenesulphonic acid hydrate (2.8 g., 14.7 mmole) in ethyl acetate (30 ml.) to give colourless needles of the p-toluenesulphonate (3.63 g., 42%), m.p. 155 to 160° (decomp.), [α]<sub>D</sub><sup>23</sup> −4.7° (c. 0.9, CHCl<sub>3</sub>), λ<sub>max.</sub> (EtOH), 257 nm. (ε 6,400), ν<sub>max.</sub> (Nujol) 2650 (N$\underline{H}$<sub>3</sub><sup>+</sup>), 1788 (β-lactam), 1722 (CO<sub>2</sub>R), 1710 (C=O), and 1010 cm.<sup>-1</sup>. (SO<sub>3</sub><sup>-</sup>), τ (DMSO-d<sup>6</sup>) 2.48 and 2.91 (p-CH<sub>3</sub>C<sub>6</sub>$\underline{H}$<sub>4</sub>SO<sub>3</sub><sup>-</sup>), 2.61 (Ph<sub>2</sub>CH—), 3.08 (Ph<sub>2</sub>C$\underline{H}$—), 4.76 (C<sub>7</sub>-H, double doublet), 4.87 (C<sub>6</sub>-H, doublet, J 5 Hz.), 6.44 (C<sub>2</sub>-H, broad singlet), 7.2 to 7.6 (—C$\underline{H}$<sub>2</sub>CH(CH<sub>3</sub>) COC$\underline{H}$<sub>2</sub>CH<sub>3</sub>, 5-proton envelope), 7.69 (p-C$\underline{H}$<sub>3</sub>C<sub>6</sub>H<sub>4</sub>—), 9.12 (triplet superimposed on doublet, C$\underline{H}$C$\underline{H}$<sub>3</sub> and —CH<sub>2</sub>CH<sub>3</sub>). [Found: C, 62.5; H, 5.7; N, 4.0; S, 9.9. C<sub>33</sub>H<sub>36</sub>N<sub>2</sub>O<sub>7</sub>S<sub>2</sub> (636.8) requires C, 62.2; H, 5.7; N, 4.4; S, 10.1%] R<sub>f</sub> 0.3 (thinlayer chromatography, kieselgel GF<sub>254+366</sub> plates, developed with benzene:ethyl acetate=2:1). [The NMR spectrum did not permit quantitative differentiation between the two isomers.]

(c) Diphenylmethyl 3-(2ξ-methyl-3-oxopentyl)-7β-[D-2-(t-butoxycarbonylamino) - 2-phenylacetamido)]ceph-3-em-4-carboxylate, first and second isomers A solution of N-(t-butoxycarbonyl)-D-phenylglycine (1.86 g., 7.72 mmole.) in dry tetrahydrofuran (20 ml.) at −10° was treated with triethylamine (0.96 ml., 7.72 mmole.), followed by isobutylchloroformate (1.02 ml., 7.72 mmole.) in dry tetrahydrofuran (10 ml.), the temperature being kept below −6°. The suspension was stirred for 30 minutes, during which time the temperature was allowed to rise to ca. 20°. The precipitated triethylamine hydrochloride was filtered off, and the filtrate added, over 5 minutes, to a solution of diphenylmethyl 7β-amino-3-(2ξ - methyl-3-oxopentyl)ceph-3-em-4-carboxylate hydrogen-p-toluene-sulphonate, second isomer (3.198 g., 5.02 mmole.) in acetonitrile (20 ml.) and N,N-dimethylacetamide (10 ml.). After stirring for 1 hour, the solvents were removed *in vacuo*; a solution of the residue in ethyl acetate (100 ml.) was stirred for 30 minutes with saturated sodium bicarbonate: water=1:1 (100 ml.), and the organic phase was separated, washed with saturated sodium bicarbonate (100 ml.), water (2× 50 ml.), and brine (50 ml.), dried (magnesium sulphate), and evaporated to a foam (3.6 g.). This material was purified by chromatography on Merck 0.05-0.2 mm. Kieselgel (80 g.), with benzene:ethyl acetate=10:1 as eluent. Combination of fractions, R<sub>f</sub> (TLC, Kieselgel GF<sub>254+366</sub>, developed with benzene: ethyl acetate=5:1) gave a foam (2.65 g., 76%), which was precipitated from ethyl acetate: petroleum ether to give a white solid (2.13 g., 61%). This material was dissolved in ethanol (20 ml.), the solution cooled to 0°, and the white precipitate of the *title ester* filtered off (240 mg., 6.8%). [This sample was a mixture (ca. 70:30) of first and second isomers.] The filtrate was evaporated to a foam, which was precipitated from ethyl acetate: petroleum ether to give a white, amorphous solid (1.4 g., 40%), m.p. 110 to 113° (decomp.), [α]<sub>D</sub><sup>23</sup> −18.8° (c. 0.81, CHCl<sub>3</sub>), λ<sub>max.</sub> (EtOH) 259 nm. (ε 7,300), ν<sub>max.</sub> (CHBr<sub>3</sub>), 3400 (NH), 1782 (β-lactam), ca. 1710 (CHCO<sub>2</sub>R, CO<sub>2</sub>R, C=O), and 1690 and 1520 cm.<sup>-1</sup> (CONH); the PMR spectrum (CDCl<sub>3</sub>) indicated that this material was a mixture (ca. 60:40) of the second and first isomers, with signals at τ 2.67 (Ph<sub>2</sub>CH and PhCH), 3.09 (Ph<sub>2</sub>C$\underline{H}$), 4.28 (C<sub>7</sub>—H, double doublet, J 5 and 9 Hz.), 4.36 (tBuOCON$\underline{H}$—, doublet, J 8 Hz.), 4.80 (PhC$\underline{H}$, doublet J 8 Hz.), 5.13 (C<sub>6</sub>—H, doublet, J 5 Hz.), 6.68 and 6.89 (C<sub>2</sub>—H, AB-quartet, J 18 Hz.), 7.2 to 7.9 (—C$\underline{H}$<sub>2</sub>CH(CH<sub>3</sub>)COC$\underline{H}$<sub>2</sub>CH<sub>3</sub>, 5-proton envelope), 8.59 [(C$\underline{H}$<sub>3</sub>)<sub>3</sub>C—], 9.01 (C$\underline{H}$<sub>3</sub>CH<sub>2</sub>—, triplet, J 7 Hz.), and 9.09 (C$\underline{H}$<sub>3</sub>CH, doublet, J 6 Hz.) for the *second isomer*, and at 6.63 and 6.91 (C<sub>2</sub>—H, AB-quartet, J 18 Hz.) for the *first isomer*. [Found: C, 66.4; H, 6.2; N, 5.8; S, 4.6. C<sub>39</sub>H<sub>43</sub>N<sub>3</sub>O<sub>7</sub>S (697.8) requires C, 67.1; H, 6.2; N, 6.0; S, 4.6%.]

(d) 7β - (D-2-amino-2-phenylacetamido)-3-(2ξ-methyl-3-oxopentyl)-ceph-3-em-4-carboxylic acid, trifluoroacetic acid salt second isomer (with first isomer)

The ester of part (c) (1.31 g., 1.88 mmole.) was treated with anisole (2.5 ml.) and trifluoroacetic acid (10 ml.) and, after 5 minutes, the reagents were removed at 30° (2 mm.). The residue was suspended in ether (50 ml.), and the suspension shaken with water (50 ml.) containing 3 drops of trifluoroacetic acid. The aqueous phase was separated, washed with ether (2× 50 ml.), and ethyl acetate (2× 50 ml.), and freeze-dried to a white crystalline solid (800 mg., 78%), m.p. 110 to 143° (decomp.), [α]<sub>D</sub><sup>26</sup> +74.1° (c. 1.11, acetone: water=1:1), λ<sub>max.</sub> 262.5 nm. (ε 8,400), ν<sub>max.</sub> (Nujol) 1756 (β-lactam), and 1680 cm.<sup>-1</sup> (C=O and CF<sub>3</sub>CO<sub>2</sub><sup>-</sup>—); the PMR spectrum indicated that this material was a mixture of *the second and first isomers* (ca. 60:40), with signals at τ (D<sub>2</sub>O) 2.46 (C<sub>6</sub>$\underline{H}$<sub>5</sub>—), 4.40 (C<sub>7</sub>—H, doublet), 4.96 (C<sub>6</sub>—H, doublet, J 4.5 Hz.), 4.75

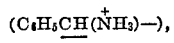

6.60 and 6.96 (C<sub>2</sub>—H, AB-quartet, J 18 Hz.), 6.90 to 7.55 (—C$\underline{H}$<sub>2</sub>CH(CH<sub>3</sub>)COC$\underline{H}$<sub>2</sub>CH<sub>3</sub>, 5-proton envelope), 8.96 (C$\underline{H}$<sub>3</sub>CH<sub>2</sub>— superimposed on CHC$\underline{H}$<sub>3</sub>) for the second isomer, and at 4.38 (C<sub>7</sub>—H, doublet), 4.94 (C<sub>6</sub>—H, doublet, J 4.5 Hz.), and 6.58 and 6.90 (AB-quartet, C<sub>2</sub>—H, J 18 Hz.) for the first isomer. [Found: C, 50.9; H, 5.1; F, 7.65; N, 7.9; S, 6.2. C<sub>23</sub>N<sub>26</sub>F<sub>3</sub>O<sub>7</sub>S (545.3) requires C, 50.6; H, 4.8; F, 10.45; N, 7.7; S, 5.9%— these figures suggested that this material contained the free acid.] The electrophoretic and chromatogaphic characteristics of this material were confirmed by comparison with those of an authentic sample.

EXAMPLE 9

(a) Diphenylmethyl 3-benzoylethyl-7β-(2-thienylacetamido)ceph-3-em-4-carboxylate A solution of diphenylmethyl 3 - iodomethyl - 7β-(2-thienylacetamido)ceph - 3-em-4-carboxylate (12.6 g., 20 mmole.) in dry methylene chloride (250 ml.) was stirred vigorously at 25° and treated, over 1 minute, with 1-pyrrolidinostyrene (10 ml., ca. 4 equiv.). The soltuion was stirred for a further 15 minutes and then stirred for 5 minutes with N hydrochloric acid (200 ml.). The organic layer was separated, washed with saturated sodium bicarbonate (200 ml.), water (200 ml.), and brine (200 ml.), dried (magnesium sulphate), and evaporated to a gum (16.645 g.). This material was purified by chromatography on 0.05–0.2 mm. Kieselgel (Merck) (340 g.), with benzene: ethyl acetate=10:1 as eluent. Combination of similar fractions (as judged by TLC) gave a foam (4.88 g.), which was crystallised from ethanol to give the *title compound* as pale yellow crystals (2.816 g., 22.5%), $R_f$ 0.44 (TLC, benzene: ethyl acetate=5:1) m.p. 171.5 to 172.5° (decomp.), $[\alpha]_D^{23}$ −29° (c. 1.07, chloroform), $\lambda_{max.}$ (EtOH) 240 nm. ($\epsilon$ 25,400), inflexion at 260 nm. ($\epsilon$ 10,500), $\nu_{max.}$ (CHBr$_3$) 3403 (NH), 1776 ($\beta$-lactam), 1720 (CO$_2$R), 1685 (ketone), and 1679 and 1510 cm.$^{-1}$ (CONH), $\tau$ (CDCl$_3$) 2.15 and 2.62 (C$_6$H$_5$CO), 4.21 (C$_{(7)}$—H, double doublet, J 4.5 and 9 Hz.), 5.05 (C$_{(6)}$—H, doublet, J 4.5 Hz.), 6.48 and 6.72 (C$_{(2)}$—CH$_2$, AB-quartet, J$_{AB}$ 18 Hz.), and 6.7 to 7.5 (unresolved multiplet, —C$\underline{H}_2$C$\underline{H}_2$COC$_6$H$_5$). (Found: C, 67.3; H, 4.8; N, 4.3; S, 10.2. C$_{35}$H$_{30}$N$_2$O$_5$S$_2$ (622.7) requires C, 67.5; H, 4.85; N, 4.5; S, 10.3%.)

(b) 3-(2-benzoylethyl)-7$\beta$-(2-thienylacetamido)ceph-3-em-4-carboxylic acid

A solution of diphenylmethyl 3-(2-benzoylethyl)-7$\beta$-(2-thienylacetamido)-ceph - 3 - em - 4 - carboxylate (2.5 g., 4.02 mmole) in trifluoracetic acid (10 ml.) and anisole (2.5 ml.) was stirred for 5 minutes at 25°. The solvents were removed *in vacuo*, and the residue partitioned between ethyl acetate and 2N-sodium bicarbonate solution. Acidification (to pH 2) of the bicarbonate solution gave the acid (1.838 g., 100%). Trituration of this material with ether gave *the acid* (900 mg., 49%) as a pale-yellow solid, m.p. 94 to 102° (decomp.), $[\alpha]_D^{26}$ +24.1° (c. 1.1, chloroform), $\lambda_{max.}$ (0.1M-phosphate buffer; pH 6) 243 nm. ($\epsilon$ 21,500), inflexion at 260 nm. ($\epsilon$ 13,300), $\nu_{max.}$ (CHBr$_3$) 3440 (NH), 1780 ($\beta$-lactam), 1735 (CO$_3$H), 1690 (ketone), and 1680 and 1512 cm.$^{-1}$ (CONH), $\tau$ (dimethylsulphoxide-d$^6$) 1.95 and 2.35 (C$_6$H$_5$CO) 4.34 (C$_{(7)}$—H, double doublet, J 4.5 and 9 Hz.), 4.90 (C$_{(6)}$—H, doublet, J 4.5 Hz.), 6.37 (C$_{(2)}$—CH$_2$, singlet), and 6.70 and 7.28 (unresolved multiplets, —C$\underline{H}_2$C$\underline{H}_2$COC$_6$H$_5$), $R_F$ 0.53 (Whatman No. 1 paper buffered to pH 5, downward development at 37° with upper phase of n-butanol: ethyl acetate: 0.1M-sodium acetate=1:8:8) and $R_F$ 0.46 (Whatman No. 1 paper buffered to pH 6, downward development with upper phase of n-butanol:ethanol:water=4:1:5, in equilibrium with lower phase, at 25°) [Found: C, 57.25; H, 4.65; N, 5.5; S, 13.2. C$_{22}$H$_{20}$N$_2$O$_5$S$_2$ (456.5) requires C, 57.9; H, 4.4; N, 6.1; S, 14.05.] This sample contained ether (0.2 mole, by NMR).

EXAMPLE 10

Diphenylmethyl 3-(2ξ-benzoylpropyl)-7$\beta$-(2-thienylacetamido-)ceph-3-em-4-carboxylate A solution of diphenylmethyl 3-iodomethyl - 7$\beta$ - (2-thienylacetamido)ceph - 3 - em-4-carboxylate (1.26 g., 2 mmole) in dry methylene chloride (2 mmole) in dry methylene chloride (25 ml.) was stirred at 25° and treated, over 1 minute, with 1-pyrrolidino-2-methylstyrene (1.0 ml., ca. 4 equiv.). The solution was stirred for 10 minutes, N-hydrochloric acid (25 ml.) added, and stirring continued for a further 5 minutes. The organic layer was separated, washed with saturated sodium bicarbonate (25 ml.), water (25 ml.) and brine (25 ml.), dried (magnesium sulphate), and evaporated to a foam (1.41 g.). This material was purified by chromatography on 0.05–0.2 mm. Kieselgel (Merck) (28 g.), with benzene:ethyl acetate=10:1 as eluant. Combination of fractions, $R_f$ 0.54 (TLC, Kieselgel GF$_{254}$ plates, benzene:ethyl acetate=5.1 eluant) gave a white, amorphous solid (62 mg., 4.9%) m.p. 75 to 88° (decomp.), $[\alpha]_D^{23}$ −1.9° (c. 1.1, CHCl$_3$), $\lambda_{max.}$ (EtOH) 238.5 nm. ($\epsilon$ 19,300), $\lambda_{inflex.}$ 260 nm. ($\epsilon$ 9,200), $\nu_{max.}$ (CHBr$_3$) 3400 (NH), 1780 ($\beta$-lactam), 17–20 (CO$_2$R), 1685 (COPh), and 1680 and 1515 cm.$^{-1}$. (CONH); the PMR spectrum indicated that this material was a mixture of isomers (ca. 1:1) of the *title compound*, with signals at $\tau$ (CDCl$_3$) 2.18 and 2.60 (COPh), 4.18 and 4.27 (C$_7$—H, two double doublets, J 5 and 9 Hz.), 5.15 and 5.22 (C$_6$—H, two doublets, J 5 Hz.), 6.3 to 7.4 (unresolved 5-proton multiplet, C$_2$—CH$_2$ superimposed on —C$\underline{H}_2$CH—), and 8.86 and 8.98

[(C$\underline{H}_3$—), two doublets, J 7 Hz.].

EXAMPLE 11

(a) Diphenylmethyl 3-(2ξ-formyl-n-propyl)-7$\beta$-(2-thienylacetamido)ceph-3-em-4-carboxylate A solution of diphenylmethyl 3-iodomethyl - 7$\beta$ - (2-thienylacetamido)ceph-3-em-4-carboxylate (6.30 g., 10 mmole) in dry methylene chloride (130 ml.) was stirred at 23° and treated, over 1 minute, with 1 - di - n - butylaminoprop-1-ene (6.75 ml., ca. 8 equiv.). The solution was stirred for a further 30 minutes, washed successively with N-hydrochloric acid (1× 80 ml., 1× 50 ml.), saturated sodium bicarbonate (50 ml.), water (50 ml.), and brine (50 ml.), dried (magnesium sulphate), and evaporated to an oily solid (8.2 g.). This material was purified by chromatography on 0.05–0.2 mm. Kieselgel (Merck) (160 g.), with benzene:ethyl acetate=10:1 as eluent. Combination of fractions, $R_f$ 0.35 (TLC, Kieselgel GF$_{254}$ plates, benzene:ethyl acetate=5:1 eluent), gave an oily solid (2.078 g.), which was dissolved in ethyl acetate (2 ml.), and the solution cooled to give the *title compound* (163 mg., 3%) as colourless needles, m.p. 183 to 185° (decomp.) $[\alpha]_D^{23}$ +7° (c. 0.57, CHCl$_3$), $\lambda_{inflex.}$ 235 nm. ($\epsilon$ 13,600), $\nu_{max.}$ (CHBr$_3$) 3420 (NH), 2730 (CHO), 1781 ($\beta$-lactam), 1720 (CO$_2$R and CHO), and 1690 and 1512 cm.$^{-1}$ (CONH); the PMR spectrum (CDCl$_3$) indicated that this material was a mixture (ca. 3:2) of diasteroisomers, with signals at $\tau$ 0.48 (CHO), 3.05 (C$\underline{H}$Ph$_2$), 4.21 (C$_7$—H, double doublet, J 5 and 9 Hz.), 5.03 (C$_6$—H, doublet, J 5 Hz.), 6.55 and 6.83 (C$_2$—H, AB-quartet, J 18 Hz.), 7.2 to 7.6 (3-proton envelope, —C$\underline{H}_2$CH—), and 9.03 (C$\underline{H}_3$—CH—, doublet, J 7 Hz.) for the major component, and at 0.52 (CHO), 6.67 (C$_2$—H), and 8.95 (C$\underline{H}_3$—CH—, doublet, J 7 Hz.) for the minor component. The NMR spectrum and microanalysis indicated that this material was contaminated with water and ethyl acetate. [Found: C, 64.65; H, 5.3; N, 4.35; S, 10.8. C$_{30}$H$_{28}$N$_2$O$_5$S$_2$ (560.7) requires C, 64.3; H, 4.9; N, 5.0; S, 11.4%.]

(b) 3-(2ξ-Formyl-n-propyl)-7$\beta$-(2-thienylacetamido) ceph-3-em-4-carboxylic acid Diphenylmethyl 3-(2-formylpropyl)-7$\beta$-(2-thienylacetamido)-ceph-3-em-4-carboxylate [mixture (ca. 3:2) of diasteroisomers, 123 mg., 0.22 mmole] was treated with anisole (0.15 ml.) and trifluoroacetic acid (0.5 ml.); after 5 minutes the reagents were evaporated at 30° (2 mm.). The residue was partitioned between ethyl acetate (20 ml.) and saturated sodium bicarbonate: water=1:1 (10 ml.). Acidification (pH2) of the bicarbonate solution gave *the acid* (78 mg., 90%) as an oil, a solution of which in ethyl acetate was run into petroleum ether to give a purer sample (47 mg., 54%) as an amorphous solid, $\lambda_{max.}$ (0.1M–pH 6 phosphate buffer) 236 nm. ($\epsilon$ 13,000), $\lambda_{inflex.}$ 260 nm. ($\epsilon$ 7,850), $\lambda_{max.}$ (CHBr$_3$) 3420 (NH) 1782 ($\beta$-lactam), 1724 (CO$_2$H and CHO), and 1688 and 151 cm.$^{-1}$ (CONH); the PMR spectrum (DMSO-d$_6$) indicated that this material was a mixture (ca. 3:2) of diasteroisomers, with signals at $\tau$ 0.36 (—CHO), 0.87 (NH, doublet, J 9 Hz.), 2.60 and 3.02 (thien-2-yl) 4.38 (C$_7$—H, double doublet, J 5 and 9 Hz.), 4.89 (C$_6$—H, doublet, J 5 Hz.), 6.22 (thien-2-yl-C$\underline{H}_2$—) 6.35 and 6.59 (C$_2$—H, AB-quartet, J 18 Hz.), 7.0 to 7.5 (—C$\underline{H}_2$CH—, three-proton envelope), and 9.00 (C$\underline{H}_3$—C$\underline{H}$—, doublet, J 7 Hz.) for one isomer, and at 4.32 (C$_7$—H, doublet doublet, J 5 and 9 Hz.), 4.90 (C$_6$—H, doublet, J 5 Hz.), 6.49 (C$_2$—H, singlet), and 8.94 ($\underline{CH}_3$CH—, double, J 7 Hz.) for the other isomer. $R_f$ 0.15 (Whatman No. 1 paper buffered to pH 5, downward development at 37° with upper phase of n-butanol: ethyl acetate: 0.1M-sodium-acetate=1:8:8) and $R_f$ 0.46 (Whatman No. 1 paper buffered to pH 6, downward development with upper phase of n-butanol:ethanol:water =4:1:5, in equilibrium with lower phase, at 25°).

EXAMPLE 12

(a) Diphenylmethyl 3-(2-formylisobutyl)-7β-(2-thienyl-acetamido)ceph-3-em-4-carboxylate A solution of diphenylmethyl 3-iodomethyl-7β-(2-thienylacetamido)ceph-3-em-4-carboxylate (12.6 g., 20 mmole) in dry methylene chloride (250 ml.) was stirred at 23° and treated with 1-pyrrolidinoisobutene (10 ml., ca. 4 equiv.). The solution was stirred for 15 minutes; N-hydrochloric acid (200 ml.) was added over 5 minutes, the organic phase separated, washed successively with saturated sodium bicarbonate (200 ml.), water (200 ml.), and brine (200 ml.), treated with charcoal (ca. 1 g.), filtered through a pad of Kieselguhr, dried (magnesium sulphate), and evaporated to a foam (10.98 g.). This material was purified by chromatography on 0.05–0.2 mm. Kieselgel (Merck) (400 g.), with benzene:ethyl acetate=10:1 as eluent. Combination of fractions, $R_f$ 0.48 (TLC, Kieselgel $GF_{254+366}$, benzene:ethyl acetate=5:1) gave *the ester* (2.49 g., 21.7%) as a foam. A purer sample was obtained, as colourless needles (965 mg., 8.4%), by crystallisation of this foam from ethyl acetate:ether=1:1 (25 ml.), m.p. 161 to 165° (decomp.), $[\alpha]_D^{23}$ +5.7° (c. 1.0, $CHCl_3$), $\lambda_{inflex.}$ (EtOH) 260 nm. (ε 66,800), $\lambda_{inflex.}$ 235 nm. (ε 14,000), $\nu_{max.}$ ($CHBr_3$) 3415 (NH), 2170 (CHO), 1780 (β-lactam), 1722 ($CO_2R$ and CHO), and 1680 and 1510 cm.$^{-1}$. (CONH), τ ($CDCl_3$) 0.64 ($C\underline{H}O$), 4.28 ($C_7$—H, double doublet, J 5 and 9 Hz.), 5.05 ($C_6$—H, doublet, J 5 Hz.), 6.84 and 7.04 ($C_2$—H, AB-quartet, J 17 Hz.), 6.99 and 7.53 ($C_3$—$\underline{CH}_2$—, AB-quartet, J 14 Hz.), and 9.11 [($C\underline{H}_3)_2$C—] [Found: C, 64.5; H, 5.3; N, 4.7; S, 11.2. $C_{31}H_{30}N_2O_5S_2$ (574.7) requires C, 64.8; H, 5.3; N, 4.9; S, 11.1%.]

(b) 3-(2-formylisobutyl)-7β-(2-thienylacetamido)ceph-3-em-4-carboxylic acid

Diphenylmethyl 3-(2-formylisobutyl)-7β-(2 - thienyl-acetamido)ceph-3-em-4-carboxylate (880 mg., 1.53 mmole) was treated with anisole (1 ml.) and trifluoroacetic acid (4 ml.) and, after 4 minutes, the reagents were evaporated at 30° (2 mm.). The residue was partitioned between ethyl acetate (30 ml.) and saturated sodium bicarbonate:water=1:1 (30 ml.). Acidification (to pH 2) of the bicarbonate layer gave *the acid* (380 mg., 61%) as an oily solid. This material was dissolved in ethyl acetate and the solution run into petroleum ether to give a purer sample as an amorphous solid (280 mg., 45%), m.p. 73 to 105° (decomp.), $[\alpha]_D^{23}$ +83.1° (c. 0.83, tetrahydrofuran), $\lambda_{max.}$ (01M-phosphate buffer; pH 6) 235 nm. (ε 13,600), $\lambda_{inflex.}$ 260 nm. (ε 8,300), $\nu_{max.}$ ($CHBr_3$) 3430 (NH), 1784 (β-lactam), 1728 ($CO_2R$ and CHO), and 1690 and 1516 cm.$^{-1}$. (CONH), τ ($D_2O$, $NaHCO_3$) 0.44 (CHO), 2.63 and 2.95 (thien-2-yl), 4.44 ($C_7$—H, doublet, J 5 Hz.), 4.92 ($C_6$—H, doublet, J 5 Hz.), 6.10(thien-2-yl-$C\underline{H}_2$—), 6.59 and 6.94 ($C_2$—H, AB-quartet, J 18 Hz), 6.88 and 7.60 ($C_3$—$\underline{CH}_2$—, AB-quartet, J 14 Hz.), and 8.90 and 8.92 [($C\underline{H}_3)_2$—, two singlets.] [Found: C, 53.1; H, 5.0; N, 6.6; S, 15.2. $C_{18}H_{20}N_2O_5S_2$ (408.5) requires C, 52.9; H, 4.9; N, 6.85; S, 15.7%.] $R_f$ 0.73 (Whatman No. 1 paper buffered to pH 5, downward development at 37° with upper phase of n-butanol; ethyl acetate: 0.1M-sodium acetate=1:8:8) and $R_f$ 0.38 (Whatman No. 1 paper buffered to pH 6, downward development with upper phase of n-butanol:ethanol:water =4:1:5, in equilibrium with lower phase, at 25°).

EXAMPLE 13

(a) Diphenylmethyl 3-(2ξ-formyl-2ξphenylethyl)-7β-(2-thienylacetamido)ceph-3-em-4-carboxylate A solution of diphenylmethyl 3-iodomethyl-7β-(2-thienylacetamido)ceph-3-em-4-carboxylate (1.26 g., 2 mmole) in dry methylene chloride (30 ml.) was treated with N-styrylpyrrolidine (1 ml., ca. 4 equiv.), and the resulting solution stirred for 30 minutes at 23°. N-Hydrochloric acid (20 ml.) was added; stirring was continued for a further 5 minutes, the organic phase separated, washed with saturated sodium bicarbonate (20 ml.), water (20 ml.), and brine (20 ml.), and dried (magnesium sulphate), and evaporated to a foam (1.51 g.). This material was purified by chromatography on 0.05–0.2 mm. Kieselgel (Merck) (100 g.), with benzene:ethyl acetate=10:1 as eluent. Combination of fractions, $R_f$ 0.53 (TLC, kieselgel $GF_{254+366}$, developed with benzene:ethyl acetate=5:1), gave a foam (600 mg.), which was precipitated from ethyl acetate:petroleum ether to give the *title compound* (530 mg., 42.6%) as an amorphous solid, m.p. 72 to 88° (decomp.), $[\alpha]_D^{23}$ −38.1° (c. 1.05, $CHCl_3$), $\lambda_{inflex.}$ (EtOH) 260 nm. (ε 7,700), $\lambda_{inflex.}$ 235 nm. (ε 14,400), $\nu_{max.}$ ($CHBr_3$) 3410 (NH), 2720 (CHO), 1774 (β-lactam), 1716 ($CO_2R$, CHO), and 1676 and 1500 cm.$^{-1}$. (CONH); the PMR spectrum ($CDCl_3$) indicated that this material was a mixture (ca. 2:1) of diastereoisomers, with signals at τ 0.40 (CHO), 4.23 ($C_7$—H, double doublet, J 5 and 9 Hz.), 5.18 ($C_6$—H, doublet, J 5 Hz.), 6.78 and 7.48 ($C_2$—H, AB-quartet, J 18 Hz.), and 6.6 to 7.0 and 7.1 to 7.5 (—$\underline{CH_2CH}$—, two unresolved multiplets) for the major component, and at τ 0.59 (CHO), 5.19 ($C_6$—H, doublet, J 5 Hz.) and 6.69 and 7.45 ($C_2$—H, AB-quartet, J 18 Hz.) for the minor component. [Found: C, 68.5; H, 5.25; N, 4.1; S, 9.9. $C_{35}H_{30}N_2O_5S_2$ (622.7) requires C, 67.5; H, 5.0; N, 4.5; S, 10.3%.] This material was contaminated with petroleum ether (by NMR).

(b) 3-(2ξ-formyl-2ξ-phenethyl)-7β-(2-thienylacetamido)ceph-3-em-4-carboxylic acid Diphenylmethyl 3-(2ξ-formyl - 2ξ - phenylethyl)-7β-(2-thienylacetamido)ceph - 3 - em - 4 - carboxylate (420 mg., 0.674 mmole) was treated with anisole (0.25 ml.) and trifluoroacetic acid (2 ml.) and, after 4 minutes, the reagents were evaporated at 30° (2 mm.). The residue was partitioned between ethyl acetate (20 ml.) and saturated sodium bicarbonate:water=1:1 (20 ml.). Acidification (to pH 2) of the bicarbonate solution gave *the acid* (290 mg., 94%) as an oil. A solution of this oil in ethyl acetate was run into petroleum ether to give a purer sample (205 mg., 67%) as an amorphous solid, m.p. 80 to 95° (decomp.), $[\alpha]_D^{23}$ +38.2° (c. 0.85, tetrahydrofuran), $\lambda_{max.}$ (0.1M-phosphate buffer; pH 6) 236 nm. (ε 13,700), $\lambda_{inflex.}$ 262.5 nm. (ε 8,450), $\nu_{max.}$ ($CHBr_3$) 3500 ($H_2O$), 3420 (NH), 2710 (CHO), 1770 (β-lactam), 1720 ($CO_2H$), 1710 (CHO), and 1690 and 1510 cm.$^{-1}$ (CONH); the PMR spectrum (DMSO-$d_6$) indicated that this material was a mixture (ca. 2:1) of diastereoisomers, with signals at τ 0.31 (CHO), 0.94 (NH), 2.61 (Ph), 2.62 and 3.02 (thien-2-yl), 4.41 ($C_7$—H, double doublet, J 5 and 9 Hz.), 5.03 and 5.06 ($C_6$—H, two doublets, J 5 Hz.), 6.24 (thien-2-yl-$C\underline{H}_2$), and 6.2 to 7.1 ($C_2H$ and —$\underline{CH_2CH}$—, 5-proton envelope) [Found: C, 56.2; H, 4.5; N, 5.55; S, 13.7. $C_{22}H_{20}N_2O_5S_2$, $H_2O$ (470.0) requires C, 56.2; H, 4.6; N, 5.95; S, 13.6%.] $R_f$ 0.61 (Whatman No. 1 paper buffered to pH 5, downward development at 37° with upper phase of n-butanol: ethyl acetate: 0.1M-sodium acetate=1:8:8) and $R_f$ 0.52 (Whatman No. 1 paper buffered to pH 6, downward development with upper phase of n-butanol:ethanol:water=4:1:5, in equilibrium with lower phase, at 25°).

EXAMPLE 14

Diphenylmethyl 3-(2ξ-ethoxycarbonyl - 3 - oxo - n-butyl)-7β - (2 - thienylacetamido)ceph-3-em-4-carboxylate and its Δ²-isomer A solution of diphenylmethyl 3-iodomethyl-7β-(2-thienylacetamido)ceph-3-em-4-carboxylate (1.26 g., 2 mmole) in dry methylene chloride (40 ml.) was treated with ethyl-3-pyrrolidinocrotonate (1.48 g., 8 mmole) in methylene chloride (20 ml.). The solution was stirred for 2 hours at 25°; N-hydrochloric acid (30 ml.) was added, stirring continued for 5 minutes, the organic phase separated, washed with saturated sodium bicarbonate (30 ml.), water (30 ml.), and brine (30 ml.), and dried (magnesium sulphate) and evaporated to a foam (1.265 g.). This material was purified by chromatography on 0.05–0.2 mm. Kieselgel (Merck) (25 g.), with benzene:ethyl acetate=10:1 as eluent. Combination of fractions, $R_f$ 0.50 (TLC, kieselgel $GF_{254+366}$ plates, developed with benzene:ethyl acetate=5:1), gave a white amorphous solid (305 mg., 24%) m.p. 80 to 95° (decomp.), $[\alpha]_D^{29}$ +3.7° (c. 1.08, $CHCl_3$), $\lambda_{inflex.}$ (EtOH) 260 nm. (ε 8,000), $\lambda_{inflex.}$ 235 nm. (ε 13,600), $\nu_{max.}$ ($CHBr_3$) 3410 (NH), 1773 (β-lactam), 1730 ($CO_2Et$), 1716 ($CO_2CHPh_2$), 1706 (COMe), and 1680 and 1500 cm.$^{-1}$. (CONH). The PMR spectrum ($CDCl_3$) indicated that this material was mainly the *title ester* with signals at 4.20 ($C_7$—H, 1-proton multiplet), 5.07 ($C_6$—H, doublet, J 5 Hz.), 5.88, 5.89

(—$CO_2\underline{CH}_2CH_3$, two superimposed quartets, J 7 Hz.), 6.2 to 7.2 ($C_2$—H superimposed on —$CH_2C\underline{H}$—, unresolved complex multiplet), 7.83, 7.94 (—$COC\underline{H}_3$, two singlets), 8.2 (C=C—Me, approx. 0.3 proton), and 8.78

(—$CO_2CH_2C\underline{H}_3$, triplet, J 7 Hz.), together with a small amount (ca. 10%) of diphenylmethyl 3-(2-ethoxycarbonyl-3-oxobutyl)-7β-(2-thienylacetamido)ceph-2-em-4-carboxylate (see Example 15), with signals at 4.40 ($C_7$—H, double duoblet, J 5 and 9 Hz.), 4.88 ($C_6$—H, doublet, J 5 Hz.) and 5.24 ($C_4$—H). [Found: C, 61.65; H, 5.0; N, 4.45; S, 9.7. $C_{33}H_{32}N_2O_7S_2\cdot\frac{1}{2}H_2O$ (641.7) requires C, 61.8; H, 5.2; N, 4.4; S, 10.0%.]

EXAMPLE 15

Diphenylmethyl 3-(2ξ-methoxycarbonyl-3-oxobutyl)-7β-(2-thienylacetamido)ceph-3-em-4-carboxylate A solution of diphenylmethyl 3-iodomethyl - 7β - (2-thienylacetamido)ceph - 3 - em - 4 - carboxylate (1.26 g., 2 mmole) in dry chloroform (30 ml.) was treated with methyl - 3 - pyrrolidinocrotonate (1.352 g., 8 mmole) in chloroform (20 ml.) and the mixture heated to reflux for 1 hour. The solution was then cooled to 25°, stirred for 10 minutes with N-hydrochloric acid (25 ml.), the organic layer separated, washed successively with saturated sodium bicarbonate (25 ml.), water (25 ml.), and brine (25 ml.), and dried (magnesium sulphate) and evaporated to a foam (1.275 g.). This material was purified by chromatography on 0.05–0.2 mm. Kieselgel (Merck) (25 g.), with benzene:ethyl acetate=10:1 as eluent. Combination of fractions, $R_f$ 0.48 (TLC, kieselgel $GF_{254+366}$ plates, developed with benzene:ethyl acetate=5:1), gave an off-white solid (530 mg., 43%), m.p. 75 to 87° (decomp.), $[\alpha]_D^{23}$ +41° (c. 1.0, $CHCl_3$), $\lambda_{max.}$ (EtOH), 241 nm. (ε 16,000), $\nu_{max.}$ ($CHBr_3$) 3416 (NH), 1775 (β-lactam), 1739 ($CO_2R$), 1700 (COMe), and 1690 and 1515 cm.$^{-1}$ (CONH); the PMR spectrum ($CDCl_3$) indicated that this material was mainly the *ceph-2-em-ester* with signals at τ 4.41 ($C_7$—H, double doublet, J 5 and 9 Hz.), 4.90 ($C_6$-H, doublet, J 5 Hz.), 5.26 ($C_4$—H), 6.34 ($CO_2C\underline{H}_3$), 6.68 and 7.34

($C_3$—$\underline{CH}_2$=C,

-enol, AB-quartet, J 14 Hz), 7.14 and 7.60

($C_3$—$\underline{CH}_2$—CH—, keto-, two superimposed AB-quartets, J 15 Hz.), and 7.84, 7.86 (—$COC\underline{H}_3$, keto- and enol-), toegther with *diphenylmethyl 3-(2-methoxycarbonyl-3-oxobutyl)-7β-(2-thienylacetamido)ceph-3-em - 4 - carboxylate* (ca. 10%) (see Example 14), with signals at 4.20 ($C_7$—H, double doublet, J 5 and 9 Hz.), 5.08 ($C_6$—H, doublet, J 5 Hz.), and 6.37 (—$CO_2C\underline{H}_3$). [Found: C, 62.05; H, 5.1; N, 4.15; S, 10.3. $C_{32}H_{30}N_2O_7S_2$ (618.7) requires C, 62.1; H, 4.9; N, 4.5; S, 10.1%.]

EXAMPLE 16

Diphenylmethyl 3 - (2ξ - t - butoxycarbonyl - 3 - oxo-n-butyl) - 7β - (2 - thienylacetamido)ceph - 3 - em - 4-carboxylate Diphenylmethyl 3-iodomethyl - 7β - (2 - thienylacetamido)ceph-3-em-4-carboxylate (1.26 g., 2 mmole) was dissolved in dry chloroform (20 ml.); t-butyl 3-pyrrolidinocrotonate (845 mg., 4 mmole) m.p. 112–113°, prepared from pyrrolidine and t-butylacetoacetate, in dry chloroform (20 ml.) was added, and the solution heated to reflux for 1 hour. After cooling to 25°, 2N-hydrochloric acid (20 ml.) was added, and the two-phase system stirred vigorously for 10 minutes. The organic phase was separated, washed successively with saturated sodium bicarbonate (20 ml.), water (20 ml.), and brine (20 ml.), and dried (magnesium sulphate) and evaporated to a foam (1.557 g.). This material was purified by chromatography on 0.05–0.2 mm. Kieselgel (Merck) (60 g.), with benzene:ethyl acetate=10:1 as eluent. Combination of fractions, $R_f$ 0.5 (TLC, kieselgel $GF_{254+366}$ plates, developed with benzene:ethyl acetate=5:1), gave a white solid (482 mg., 37%), m.p. 57 to 67° (decomp.), $[\alpha]_D^{23}$ +31.6° (c. 0.95, tetrahydrofuran), $\lambda_{inflex.}$ (EtOH) 260 nm. (ε 7,900), $\lambda_{inflex.}$ 235 nm. (ε 15,100), $\nu_{max.}$ ($CHBr_3$) 3420 (NH), 1780 (β-lactam), 1730 ($CO_2R$), 1710

($CO_2CHPh_2$ and $COCH_3$), and 1682 and 1512 cm.$^{-1}$. (CONH); the PMR spectrum ($CDCl_3$) indicated that this material was essentially the *title compound* with signals at τ 4.20 ($C_7$—H, double doublet, J 5 and 9 Hz.), 5.06 ($C_6$—H, doublet, J 5 Hz.), 6.4 to 7.3 ($C_2$—H and $C_3$—$\underline{CH}_2C\underline{H}$—, unresolved 5-proton envelope), 7.84 and 7.96 ($COC\underline{H}_3$, keto- and enoltautomers), and 8.59 [($C\underline{H}_3)_3C$—], together with diphenylmethyl 3-(2ξ-t-butoxycarbonyl-3-oxobutyl)-7β-(2-thienylacetamido)ceph-2-em-4-carboxylate (ca. 30%), with signals 4.20 ($C_7$—H, double doublet, J 5 and 9 Hz.), 4.90 (C6—H, doublet, J 5 Hz.), 5.24 ($C_4$—H), 7.88 (—$COC\underline{H}_3$), and 8.55 [($C\underline{H}_3)_3C$—] [Found: C, 63.8; H, 5.7; N, 3.9; S, 9.95. $C_{35}H_{36}N_2O_6S_2$, $H_2O$ (658.3) requires C, 63.9; H, 5.7; N, 4.3; S, 9.7%.]

EXAMPLE 17

Diphenylmethyl 3-(2-benzoylethyl)-7β-aminoceph-3-em-4-carboxylate, p-toluenesulphonic acid salt A stirred solution of diphenylmethyl 3-(2-benzoylethyl)-7β-(2-thienylacetamido)ceph-3-em-4-carboxylate (363 mg, 0.583 mmole) and pyridine (0.56 ml., 6.996 mmole) in dry methylene chloride (10 ml.) was cooled to −15° and treated, over 10 minutes, with a suspension of phosphorous pentachloride (364 mg., 1.749 mmole) in dry methylene chloride (10 ml.); the temperature was kept at −10 to −12°. The solution was stirred at −10° for 30 minutes, cooled to −20°, and methanol (5 ml.) added at such a rate that the temperature did not rise above −12°. The temperature was then allowed to rise to 23°, the solution stirred for 4 hours, N-hydrochloric acid (20 ml.) added, and the two-phase system stirred for 10 minutes. The organic phase was separated, stirred vigorously with saturated sodium bicarbonate (30 ml.), for 30 minutes, washed with water (30 ml.) and brine (30 ml.), dried (magnesium sulphate), and evaporated to a gum (455 mg.). This material was purified by chromatography on 0.05–0.2 mm. Kieselgel (Merck) (25 g.), with benzene:ethyl acetate=5:1, and subsequently with benzene:ethyl acetate=2:1, as eluent. Combination of fractions, $R_f$ 0.35 (TLC, kieselgel $GF_{254}$ plates, benzene:ethyl acetate=2:1 eluent) gave an oily solid (144 mg.). A solution of this solid in ethyl acetate (1 ml.) and ether (2 ml.) was treated with p-toluenesulphonic acid (114 mg., 0.6 mmole) in ethyl acetate (1 ml.), more ether (2 ml.) slowly added, and the solution cooled to give white crystals of the salt (127 mg., 32.5%), m.p. 128 to 132° (decomp.), $[\alpha]_D^{25}$ −2.3° (c. 0.95, $CHCl_3$), $\lambda_{max}$. (EtOH) 244 nm. ($\epsilon$ 18,000), $\nu_{max}$. ($CHBr_3$) 2640 ($NH_3^+$), 1788 ($\beta$-lactam), 1720 ($CO_2R$), and 1684 cm.$^{-1}$ (COPh), $\tau$ ($CDCy_3$) 2.18 and 2.97 ($p.CH_3.C_6H_4SO_3^-$) 3.10 ($Ph_2\underline{CH}$), 5.03 ($C_7$—H, double doublet), 5.08 ($C_6$—H doublet), 6.50 and 7.25 ($C_2$—H, AB-quartet, J 16 Hz.), 7.10 (4-proton envelope, —$\underline{CH_2CH_2}$COPh), and 7.82 ($p$-$CH_3.C_6H_4$—) [Found: C, 63.6; H, 5.2; N, 3.6; S, 9.5. $C_{36}H_{34}N_2O_7S_2$, ½$H_2O$ (679.8) requires C, 63.6; H, 5.2; N, 4.1; S, 9.4%.]

PHARMACEUTICAL EXAMPLES

A. Intramuscular Injection

Composition of single injection

7β-(D-2-amino-2-phenylacetamido) - 3 - (2ξ-methyl-3-oxopentyl)ceph-3-em-4-carboxylic acid __mg__ 250
Sodium chloride _____w./v__ 0.8
Water for injection to produce 2 ml.

The solids were dissolved in water and the resulting solution sterilized by filtration through a No. 5/3 sintered glass filter. The sterilized solution was distributed in 2.2 ml. portions in 2 ml. ampoules and the ampoules sealed hermetically. The ampoules were then subjected to sterility tests in the usual manner.

B. Tablet

|  | Mg. |
|---|---|
| (a) 7β-(D-2-amino-2-phenylacetamido) - 3 - (2ξ-methyl-3-oxopentyl)ceph - 3 - em - 4 - carboxylic acid | 250 |
| (b) Mannitol | 75 |
| (c) Potato starch | 46 |
| (d) Maize starch | 25 |
| (e) Magnesium stearate | 4 |

The dry ingredients (a), (b) and (c) were blended together and granulated with a 10% aqueous paste of (d). The granules were passed through a No. 12 mesh (B.S.) screen dried to constant weight and sieved through a No. 16 mesh (B.S.) screen. The granules were then lubricated by blending in (e) and compressed at 400 mg. per tablet on suitable punches. The tablets may be coated if required, for instance with a readily soluble conventional film coating.

C. Capsule

|  | Mg. |
|---|---|
| 7β-(D-2-amino-2-phenylacetamido) - 3 - (2ξ-methyl-3-oxopentyl)ceph-3-em-4-carboxylic acid | 250 |
| Aerosil compositum* | 3 |

*A silicon dioxide/starch blend available from Bush, Beach and Gent of Marlon House, Lloyd's Avenue, London, E.C.3.

The dry powders were blended together homogenously and distributed into well fitted, hard gelatine capsules, so that each contained 250 mg. of the active ingredient.

I claim:

1. A compound of the formula

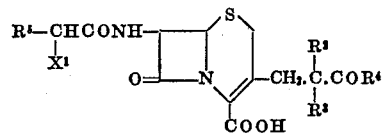

wherein $R^5$ is phenyl; phenyl substituted with chloro, bromo, hyrdoxy, lower alkyl, nitro, amino, lower alkanoyl, lower alkoxy or lower alkylmercapto; thien-2-yl; thien-3-yl; or naphthyl; $X^1$ is amino, hydroxy, formyloxy, lower alkanoyloxy or hydrogen; $R^2$ is hydrogen; lower alkyl; phenyl; phenyl substituted by chloro, bromo, lower alkyl, lower alkoxy, nitro, amino or lower alkylamino; lower alkoxy-carbonyl; mono- or di-phenyl lower alkoxycarbonyl; lower alkylcarbonyl; phenyl lower alkyl or $C_5$ or $C_6$ cycloalkyl; $R^3$ is lower alkyl; phenyl; phenyl substituted by chloro, bromo, lower alkyl, lower alkoxy, nitro, amino or lower alkylamino; lower alkoxy-carbonyl; mono- or di-phenyl lower alkoxycarbonyl; lower alkylcarbonyl; phenyl lower alkyl or $C_5$ or $C_6$ cycoalkyl; and $R^4$ is hydrogen; lower alkyl; phenyl; phenyl substituted by chloro, bromo, lower alkyl, lower alkoxy, nitro, amino or lower alkylamino; phenyl lower alkyl or $C_5$ or $C_6$ cycloalkyl; or a physiologically acceptable base salt or acid addition salt thereof.

2. A compound as claimed in claim 1 wherein $R^5$ is thien-2-yl or thien-3-yl.

3. A compound of the formula

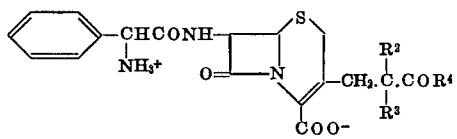

wherein $R^2$, $R^3$ and $R^4$ have the meanings assigned in claim 1 or a physiologically acceptable base salt or acid addition salt thereof.

4. The compound of claim 3 which is 7β-(D-2-amino-2-phenylacetamido)-3-(2ξ-methyl - 3 - oxopentyl)ceph-3-em-4-carboxylic acid

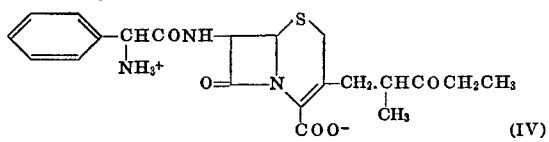

5. The compound of claim 1 which is sodium 3-(2ξ-methyl-3-oxopentyl) - 7β - (2-thienylacetamido)ceph-3-em-4-carboxylate.

6. The compound of claim 1 which is 7β-(D-2-amino-2-phenylacetamido)-3-(2-methyl - 3 - oxopentyl)ceph-3-em-4-carboxylic acid trifluoroacetate.

7. The compound of claim 1 which is 3-(2ξ-ethoxycarbonyl-3-oxobutyl) - 7β - (2-thienylacetamido)ceph-3-em-4-carboxylic acid.

8. The compound of claim 1 which is 3-(2-acetyl-3-oxobutyl)-7β-(2 - thienylacetamido)ceph - 3 - em-4-carboxylic acid.

9. The compound of claim 1 which is 3-(2ξ-formylpropyl)-7β-(2 - thienylacetamido)ceph-3-em-4-carboxylic acid.

10. The compound of claim 1 which is 3-(2-formylisobutyl) - 7β - (2 - thienylacetamido)ceph-3-em-4-carboxylic acid.

11. The compound of claim 1 which is 3-(2ξ-t-butoxycarbonyl-3-oxobutyl) - 7β - (2-thienylacetamido)ceph-3-em-4-carboxylic acid.

12. The compound of claim 1 which is 3-(2ξ-diphenylmethoxycarbonyl-3-oxobutyl)-7β-(2 - thienylacetamido)ceph-3-em-4-carboxylic acid.

13. The compound of claim 1 which is 3-(2ξ-benzoyl-2ξ - ethoxycarbonylethyl)-7β-(2 - thienylacetamido)ceph-3-em-4-carboxylic acid.

14. The compound of claim 1 which is 3-(2ξ-formyl-2ξ-phenylethyl) - 7β - (2-thienylacetamido)ceph-3-em-4-carboxylic acid.

References Cited

UNITED STATES PATENTS

| 3,497,505 | 2/1970 | Pfeiffer et al. | 260—243 C |
| 3,464,985 | 9/1969 | Holdrege | 260—243 C |
| 3,634,417 | 1/1972 | Attenburron | 260—243 C |

NICHOLAS S. RIZZO, Primary Examiner

U.S. Cl. X.R.

424—246